(12) United States Patent
Kitano

(10) Patent No.: US 11,177,120 B2
(45) Date of Patent: Nov. 16, 2021

(54) MASS SPECTROMETRY METHOD, MASS SPECTROMETRY DEVICE, PROGRAM, AND MASS SPECTROMETRY KIT

(71) Applicant: SHIMADZU CORPORATION, Kyoto (JP)

(72) Inventor: Riki Kitano, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 17/045,294

(22) PCT Filed: Apr. 3, 2019

(86) PCT No.: PCT/JP2019/014747
§ 371 (c)(1),
(2) Date: Oct. 5, 2020

(87) PCT Pub. No.: WO2019/194216
PCT Pub. Date: Oct. 10, 2019

(65) Prior Publication Data
US 2021/0151303 A1      May 20, 2021

Related U.S. Application Data

(60) Provisional application No. 62/653,014, filed on Apr. 5, 2018.

(51) Int. Cl.
*H01J 49/00* (2006.01)
*G01N 30/72* (2006.01)
*H01J 49/04* (2006.01)

(52) U.S. Cl.
CPC ...... *H01J 49/0009* (2013.01); *G01N 30/7206* (2013.01); *H01J 49/0036* (2013.01); *H01J 49/0422* (2013.01)

(58) Field of Classification Search
CPC ............. H01J 49/0009; H01J 49/0036; H01J 49/0422; G01N 30/7206; G01N 27/62
USPC ................................. 250/281, 282
See application file for complete search history.

(56) References Cited

FOREIGN PATENT DOCUMENTS

JP      2005-062061 A      3/2005

OTHER PUBLICATIONS

United States Environmental Protection Agency, Method 608: Organochlorine Pesticides and PCBs, 1984 (Year: 1984).*
"Method 608: Organochlorine Pesticides and PCBS", EPA, United States Environmental Protection Agency, 1984, 33 pages.
(Continued)

*Primary Examiner* — Michael Maskell
(74) *Attorney, Agent, or Firm* — Sughrue Mion, PLLC

(57) ABSTRACT

A mass spectrometry method includes: preparing calibration data for performing calibration on a basis of first data obtained by detecting a chlorobiphenyl in first mass spectrometry of a reference sample of the chlorobiphenyl; acquiring second data obtained by detecting, in second mass spectrometry of a sample, at least one chlorobiphenyl that has a same chlorine number as and is different in kind from the chlorobiphenyl detected in the first mass spectrometry; and calculating a quantitative value for the chlorobiphenyl contained in the sample on a basis of the calibration data and the second data.

14 Claims, 13 Drawing Sheets

(56) References Cited

OTHER PUBLICATIONS

Mengliang Zhang, et al., "Automated pipeline for classifying Aroclors in soil by gas chromatography/mass spectrometry using modulo compressed two-way data objects", Talanta, 2013, vol. 117, pp. 483-491.
International Search Report for PCT/JP2019/014747 dated Jul. 2, 2019 (PCT/ISA/210).
Written Opinion for PCT/JP2019/014747 dated Jul. 2, 2019 (PCT/ISA/237).

* cited by examiner

FIG. 3

TABLE A

AREA S1 — FIRST CALIBRATION DATA
AREA S2 — SECOND CALIBRATION DATA
⋮
AREA S9 — NINTH CALIBRATION DATA

A31 →

| NAME OF CHLOROBIPHENYL | RATIO |
|---|---|
| MONOCHLOROBIPHENYL | 9% |
| DICHLOROBIPHENYL | 37% |
| TRICHLOROBIPHENYL | 25% |
| TETRACHLOROBIPHENYL | 14% |
| PENTACHLOROBIPHENYL | 6% |
| HEXACHLOROBIPHENYL | 3% |
| HEPTACHLOROBIPHENYL | 4% |
| OCTACHLOROBIPHENYL | 2% |
| NONACHLOROBIPHENYL | 0% |

A32 ⇅ CALCULATE DEGREE OF SIMILARITY

TABLE B

| NAME OF CHLOROBIPHENYL | PRODUCTS | | | | | | |
|---|---|---|---|---|---|---|---|
|  | A | B | C | D | E | F | G |
| MONOCHLOROBIPHENYL | 1% | 59% | 32% | 1% | 0% | 0% | 0% |
| DICHLOROBIPHENYL | 20% | 37% | 28% | 17% | 3% | 0% | 0% |
| TRICHLOROBIPHENYL | 48% | 4% | 22% | 40% | 21% | 1% | 0% |
| TETRACHLOROBIPHENYL | 31% | 0% | 17% | 38% | 59% | 19% | 0% |
| PENTACHLOROBIPHENYL | 1% | 0% | 1% | 5% | 15% | 53% | 9% |
| HEXACHLOROBIPHENYL | 0% | 0% | 0% | 0% | 1% | 27% | 45% |
| HEPTACHLOROBIPHENYL | 0% | 0% | 0% | 0% | 0% | 1% | 37% |
| OCTACHLOROBIPHENYL | 0% | 0% | 0% | 0% | 0% | 0% | 9% |
| NONACHLOROBIPHENYL | 0% | 0% | 0% | 0% | 0% | 0% | 1% |

FIG. 7

TABLE C

| NAME OF CHLOROBIPHENYL | PRODUCTS | | | | | | |
|---|---|---|---|---|---|---|---|
| | A+A | A+B | A+C | A+D | A+E | A+F | A+G |
| MONOCHLOROBIPHENYL | – | 30.0% | 16.5% | 1.0% | 0.5% | 0.5% | 0.5% |
| DICHLOROBIPHENYL | – | 28.5% | 24.0% | 18.5% | 11.5% | 10.0% | 10.0% |
| TRICHLOROBIPHENYL | – | 26.0% | 35.0% | 44.0% | 34.5% | 24.5% | 24.0% |
| TETRACHLOROBIPHENYL | – | 15.5% | 24.0% | 34.5% | 45.0% | 25.0% | 15.5% |
| PENTACHLOROBIPHENYL | – | 0.5% | 1.0% | 3.0% | 8.5% | 27.0% | 5.0% |
| HEXACHLOROBIPHENYL | – | 0% | 0% | 0% | 0.5% | 13.5% | 22.5% |
| HEPTACHLOROBIPHENYL | – | 0% | 0% | 0% | 0% | 0.5% | 18.5% |
| OCTACHLOROBIPHENYL | – | 0% | 0% | 0% | 0% | 0% | 4.5% |
| NONACHLOROBIPHENYL | – | 0% | 0% | 0% | 0% | 0% | 0.5% |

FIG. 9

TABLE D

| ID | 1016 | | 1221 | | 1232 | | 1242 | | 1248 | | 1254 | | 1260 | |
|---|---|---|---|---|---|---|---|---|---|---|---|---|---|---|
| CONCENTRATION | 10ppb | 100ppb | 10ppb | 100ppb | 10ppb | 100ppb | 10ppb | 100ppb | 10ppb | 100ppb | 10ppb | 100ppb | 10ppb | 100ppb |
| Mix1 | 9.6 | 112.4 | 16.0 | 164.9 | 9.4 | 109.9 | 8.8 | 107.1 | 7.7 | 108.1 | 6.2 | 101.1 | 4.8 | 101.6 |
| Mix2 | 10.9 | 124.5 | 15.8 | 165.5 | 9.9 | 114.3 | 9.7 | 114.1 | 7.5 | 103.0 | 5.8 | 92.7 | 4.4 | 100.2 |
| Mix3 | 11.8 | 138.1 | 18.9 | 196.1 | 11.3 | 132.2 | 10.8 | 130.5 | 9.1 | 127.3 | 6.9 | 109.0 | 4.1 | 95.1 |

FIG. 10

TABLE E

| ID | 1016 | | 1221 | | 1232 | | 1242 | | 1248 | | 1254 | | 1260 | |
|---|---|---|---|---|---|---|---|---|---|---|---|---|---|---|
| CONCENTRATION | 10ppb | 100ppb | 10ppb | 100ppb | 10ppb | 100ppb | 10ppb | 100ppb | 10ppb | 100ppb | 10ppb | 100ppb | 10ppb | 100ppb |
| Mix1 | 9.2 | 110.1 | 15.7 | 148.8 | 9.2 | 103.7 | 8.3 | 105.9 | 7.3 | 107.1 | 6.0 | 107.7 | 4.7 | 113.6 |
| Mix2 | 10.6 | 122.5 | 15.8 | 150.4 | 9.8 | 108.4 | 9.2 | 113.1 | 7.1 | 102.8 | 6.0 | 100.3 | 4.3 | 113.1 |
| Mix3 | 11.4 | 135.1 | 18.6 | 177.0 | 11.1 | 124.7 | 10.2 | 128.9 | 9.0 | 126.4 | 6.5 | 116.6 | 4.2 | 107.3 |

FIG. 11

TABLE F    DRUG REFERENCE SAMPLE

| COMPOUNDS | CALIBRATION RANGE (ppb) | RSD (%) |
|---|---|---|
| $\alpha$-BHC | 0.5-200 | 14.7 |
| $\gamma$-BHC | 0.5-200 | 28.6 |
| $\beta$-BHC | 0.5-200 | 14.0 |
| $\delta$-BHC | 0.5-200 | 24.7 |
| HEPTACHLOR (Heptachlor) | 0.5-200 | 7.1 |
| HEPTACHLOR EPOXIDE (Heptachlor epoxide) | 0.5-200 | 12.5 |
| ALDRIN (Aldrin) | 0.5-200 | 17.9 |
| DIELDRIN (Dieldrin) | 1-200 | 28.3 |
| ENDRIN (Endrin) | 0.5-200 | 29.3 |
| ENDRIN ALDEHYDE (Endrin aldehyde) | 1-200 | 24.3 |
| ENDRIN KETONE (Endrin ketone) | 10-200 | 17.0 |
| TRANS-CHLORDANE (trans-Chlordane) | 0.5-200 | 17.6 |
| CIS-CHLORDANE (cis-Chlordane) | 0.5-200 | 21.9 |
| ENDOSULFAN I (Endosulfan I) | 0.5-200 | 23.6 |
| ENDOSULFAN II (Endosulfan II) | 0.5-200 | 27.3 |
| ENDOSULFAN SULFATE (Endosulfan sulfate) | 0.5-200 | 24.6 |
| 4,4'-DDE | 0.5-200 | 25.5 |
| 4,4'-DDD | 0.5-200 | 26.4 |
| 4,4'-DDT | 0.5-200 | 25.5 |
| METHOXYCHLOR (Methoxychlor) | 0.5-200 | 27.6 |
| Hx-Sed | 5-200 | 28.1 |
| Hep-Sed | 10-200 | 28.2 |
| Parlar-26 | 20-200 | 22.7 |
| Parlar-40, 41 | 10-200 | 27.0 |
| Parlar-44 | 20-200 | 26.4 |
| Parlar-50 | 20-200 | 28.4 |
| Parlar-62 | 10-200 | 25.9 |

FIG. 12

TABLE G          REFERENCE SAMPLE 1

| NAME OF CHLOROBIPHENYL | CALIBRATION RANGE(ppb) | RSD(%) |
|---|---|---|
| MONOCHLOROBIPHENYL No. 1 | 0.5-200 | 11.1 |
| DICHLOROBIPHENYL No. 4 | 0.5-200 | 10.8 |
| TRICHLOROBIPHENYL No. 18 | 0.5-200 | 8.6 |
| TETRACHLOROBIPHENYL No. 52 | 0.5-200 | 7.9 |
| PENTACHLOROBIPHENYL No. 101 | 0.5-200 | 7.9 |
| HEXACHLOROBIPHENYL No. 149 | 0.5-200 | 15.4 |
| HEPTACHLOROBIPHENYL No. 187 | 0.5-200 | 13.5 |
| OCTACHLOROBIPHENYL No. 199 | 0.5-200 | 16.2 |
| NONACHLOROBIPHENYL No. 208 | 0.5-200 | 6.6 |

FIG. 13

TABLE H    REFERENCE SAMPLE 2

| NAME OF CHLOROBIPHENYL | CALIBRATION RANGE (ppb) | RSD (%) |
|---|---|---|
| MONOCHLOROBIPHENYL No. 2 | 0.5-200 | 10.9 |
| DICHLOROBIPHENYL No. 6 | 0.5-200 | 10.9 |
| TRICHLOROBIPHENYL No. 31 | 0.5-200 | 9.7 |
| TETRACHLOROBIPHENYL No. 44 | 0.5-200 | 8.2 |
| PENTACHLOROBIPHENYL No. 110 | 0.5-200 | 9.1 |
| HEXACHLOROBIPHENYL No. 153 | 0.5-200 | 14.1 |
| HEPTACHLOROBIPHENYL No. 183 | 0.5-200 | 18.3 |
| OCTACHLOROBIPHENYL No. 203 | 0.5-200 | 11.2 |
| NONACHLOROBIPHENYL No. 207 | 0.5-200 | 5.7 |

MASS SPECTROMETRY METHOD, MASS SPECTROMETRY DEVICE, PROGRAM, AND MASS SPECTROMETRY KIT

CROSS REFERENCE TO RELATED APPLICATIONS

This application is a National Stage of International Application No. PCT/JP2019/014747 filed Apr. 3, 2019, claiming priority based on U.S. Provisional Patent Application No. 62/653,014 filed Apr. 5, 2018.

TECHNICAL FIELD

The present invention relates to a mass spectrometry method, a mass spectrometry device, a program, and a mass spectrometry kit.

BACKGROUND ART

A chlorobiphenyl is a molecule obtained by substituting at least one of ten hydrogen atoms of biphenyl with a chlorine atom. Chlorobiphenyls range from monochlorobiphenyls having one chlorine atom to a decachlorobiphenyl having ten chlorine atoms, and are classified according to the number of chlorine atoms. Even when containing the same number of chlorine atoms, chlorobiphenyls other than a decachlorobiphenyl have isomers different in the position(s) of a chlorine atom(s) in a molecule.

Chlorobiphenyls are excellent in, for example, insulation properties or thermal stability, and therefore have been produced as, for example, lubricant oils or insulation oils. However, some of isomers of chlorobiphenyls are toxic to living organisms. Therefore, analysis of chlorobiphenyls in a sample derived from, for example, an environment or a product is important to understand risks to living organisms. Non-Patent Literature 1 discloses a method for analyzing a mixture containing chlorobiphenyls with a gas chromatograph having an electron capture detector. However, in the case of the method disclosed in Non-Patent Literature 1, when the number of compounds contained in a sample increases, analysis is difficult to perform because a chromatogram has many peaks.

CITATION LIST

Non-Patent Literature

NPTL1: U.S. Environmental Protection Agency, "METHOD 608-ORGANOCHLORINE PESTICIDES AND PCBS", [online], 1984, U.S. Environmental Protection Agency, [searched on Feb. 28, 2019], Internet<URL:https://www.epa.gov/sites/production/files/2015-09/documents/method_608_1984.pdf#search=%27EPA608+method+608%27>

SUMMARY OF INVENTION

Technical Problem

When chlorobiphenyls contained in a sample are separated and detected by mass spectrometry, analysis becomes easy to perform, but much time and effort is required to prepare calibration curves for individual chlorobiphenyls.

Solution to Problem

The 1st aspect of the present invention relates to a mass spectrometry method comprising: preparing calibration data for performing calibration on a basis of first data obtained by detecting a chlorobiphenyl in first mass spectrometry of a reference sample of the chlorobiphenyl; acquiring second data obtained by detecting, in second mass spectrometry of a sample, at least one chlorobiphenyl that has a same chlorine number as and is different in kind from the chlorobiphenyl detected in the first mass spectrometry; and calculating a quantitative value for the chlorobiphenyl contained in the sample on a basis of the calibration data and the second data.

The 2nd aspect of the present invention relates to a mass spectrometry device comprising: a calibration data preparation part configured to prepare calibration data for performing calibration on a basis of first data obtained by detecting a chlorobiphenyl in first mass spectrometry of a reference sample of the chlorobiphenyl; a data acquisition part configured to acquire second data obtained by detecting, in second mass spectrometry of a sample, at least one chlorobiphenyl that has a same chlorine number as and is different in kind from the chlorobiphenyl detected in the first mass spectrometry; and a calculation part configured to calculate a quantitative value for the chlorobiphenyl contained in the sample on a basis of the calibration data and the second data.

The 3rd aspect of the present invention relates to A program for allowing a processing device to perform: calibration data preparation processing in which calibration data for performing calibration is prepared on a basis of first data obtained by detecting a chlorobiphenyl in first mass spectrometry of a reference sample of the chlorobiphenyl; data acquisition processing in which second data obtained by detecting, in second mass spectrometry of a sample, at least one chlorobiphenyl that has a same chlorine number as and is different in kind from the chlorobiphenyl detected in the first mass spectrometry is acquired; and calculation processing in which a quantitative value is calculated for the chlorobiphenyl contained in the sample on a basis of the calibration data and the second data.

The 4th aspect of the present invention relates to a mass spectrometry kit for use in the mass spectrometry method according to the 1st aspect.

Advantageous Effects of Invention

According to the present invention, it is possible to efficiently perform mass spectrometry on a chlorobiphenyl-containing sample.

BRIEF DESCRIPTION OF DRAWINGS

FIG. 3 is a conceptual diagram for explaining the mass spectrometry method according to the embodiment.

FIG. 7 is a table showing the compositions of product mixtures each obtained by mixing a product A and any one of products B to G in a predetermined ratio.

FIG. 9 is a table showing the concentrations of each product added to individual samples to be analyzed and quantitatively-determined concentrations in an example.

FIG. 10 is a table showing the concentrations of each product added to individual samples to be analyzed and quantitatively-determined concentrations in an example.

FIG. 11 is a table showing the calibration ranges and RSDs of individual drug reference samples in an example.

FIG. 12 is a table showing the calibration ranges and RSDs of individual reference samples in a reference sample 1 in the example.

FIG. 13 is a table showing the calibration ranges and RSDs of individual reference samples in a reference sample 2 in the example.

DESCRIPTION OF EMBODIMENT

Hereinbelow, an embodiment for carrying out the present invention will be described with reference to the drawings.

First Embodiment

In a mass spectrometry method according to the present embodiment, mass spectrometry is performed on reference samples of chlorobiphenyls to prepare data for performing calibration (hereinafter referred to as calibration data), and data analysis is performed on the basis of the calibration data and data obtained by performing mass spectrometry on a sample to be analyzed. In this data analysis, what chlorobiphenyl-containing mixture is contained in the sample is identified.

In the following description, mass spectrometry of reference samples of chlorobiphenyls is referred to as first mass spectrometry, and mass spectrometry of a sample to be analyzed (hereinafter referred to as an analysis sample) is referred to as second mass spectrometry. In the following description, the above-described chlorobiphenyl-containing mixture is described as a product having a known composition of two or more kinds of chlorobiphenyls. This product is referred to as a chlorobiphenyl product. The identification of a chlorobiphenyl product contained in an analysis sample is useful in assessing the risks of an environment or an object from which the analysis sample is derived. Actually, in some countries or regions, it is required to identify what chlorobiphenyl product is contained when risk assessment of chlorobiphenyls is performed. However, the mass spectrometry method according to the present embodiment can be applied to obtain information as to whether an analysis sample contains a mixture containing two or more kinds of chlorobiphenyls irrespective of whether or not the mixture is a product.

Analysis Sample

The analysis sample is not particularly limited as long as it is a sample that may contain chlorobiphenyls and that can be subjected to mass spectrometry or mass spectrometry performed in combination with another analysis method. As described above, since chlorobiphenyls may be present in, for example, an environment or a product, the analysis sample can be prepared from, for example, a sample collected from an environment or at least part of a product.

Mass Spectrometry

A method for the first mass spectrometry and the second mass spectrometry is not particularly limited as long as chlorobiphenyls can be separated with desired accuracy by such mass spectrometry. When it is necessary to simultaneously detect another molecule having a mass substantially the same as that of a chlorobiphenyl, tandem mass spectrometry is preferred. Further, mass spectrometry combined with another separation method is preferably performed in order to increase the number of times of separation to detect chlorobiphenyls etc. with higher accuracy. Gas chromatography/mass spectrometry (GC/MS) or Liquid chromatography/mass spectrometry (LC/MS) is more preferred.

First Mass Spectrometry

Figure 1:
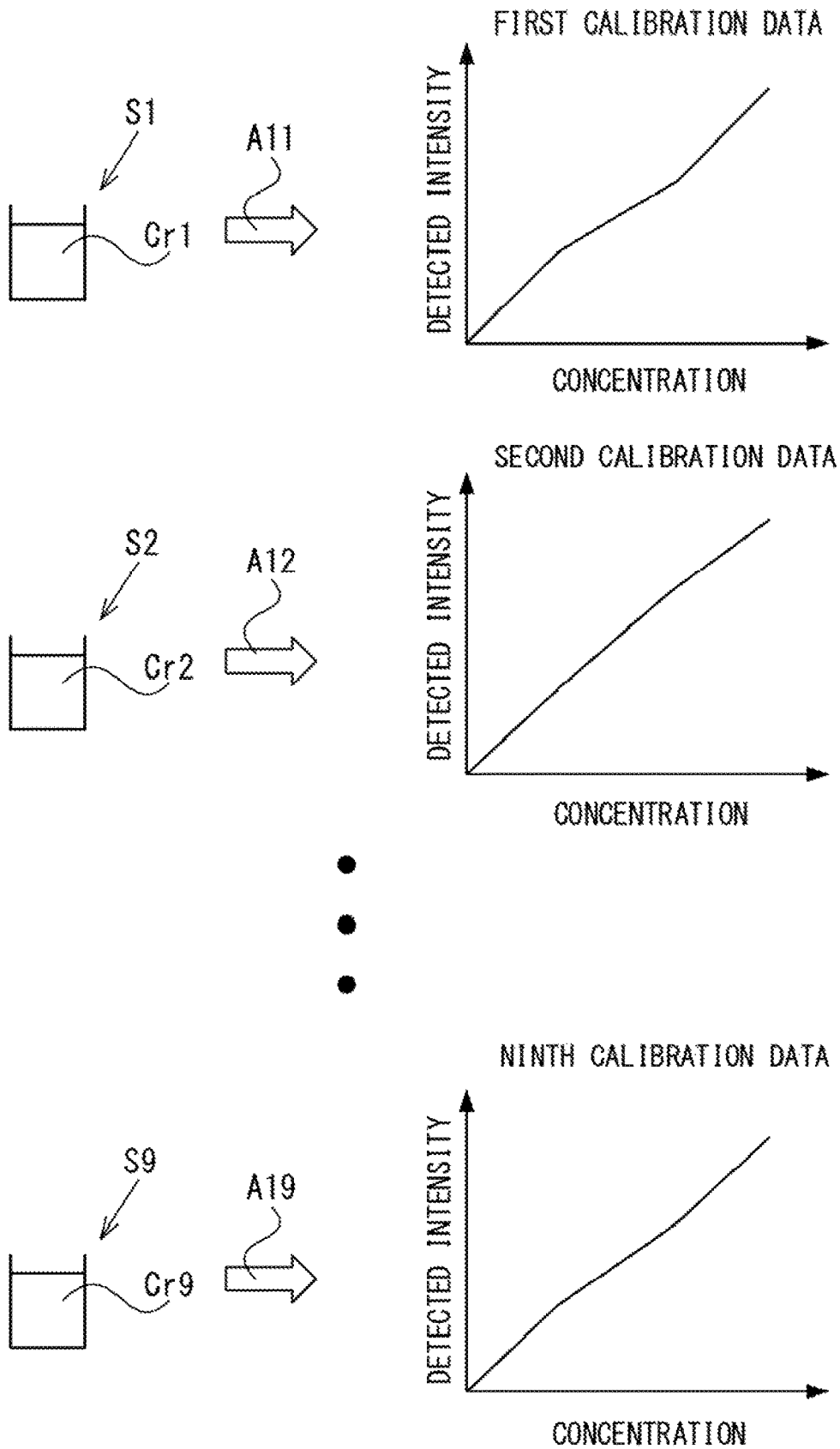
FIG. 1 is a conceptual diagram for explaining a mass spectrometry method according to an embodiment.

FIG. 1 is a conceptual diagram for explaining the first mass spectrometry. Reference sign Sn denotes a reference sample containing a known concentration of a chlorobiphenyl having n chlorine atom(s). The number of chlorine atoms (hereinafter sometimes referred to as a chlorine number) represented by n ranges from 1 to 10. Chlorobiphenyls containing 1, 2, 3, 4, 5, 6, 7, 8, 9, and 10 chlorine atoms are respectively named by adding prefixes "mono", "di", "tri", "tetra", "penta", "hexa", "hepta", "octa", "nona", and "deca" to the term "chlorobiphenyl". In the following description, calibration data is prepared for each n from 1 to 9, but the range of the chlorine number n is not particularly limited and may appropriately be set.

Mass spectrometry is performed on a reference sample S1 containing a known concentration of a monochlorobiphenyl Cr1 so that ions derived from the monochlorobiphenyl Cr1 are detected, and data (hereinafter referred to as reference sample intensity data; reference sample intensity data about a reference sample Sn is referred to as nth reference sample intensity data) is prepared which shows mass-to-charge ratios (m/z) corresponding to the detected ions and detected intensities corresponding to the m/z values. The reference sample intensity data is, for example, data corresponding to a chromatogram (mass chromatogram) showing a temporal change in the detected intensity of an ion at a predetermined m/z value. From the first reference sample intensity data, an intensity corresponding to the monochlorobiphenyl Cr1 is calculated. From the calculated intensity and the known concentration of the monochlorobiphenyl Cr1 in the reference sample S1, calibration data is prepared (arrow A11). The calibration data about the reference sample S1 is defined as first calibration data.

The calibration data is data for calibrating the concentration of a chlorobiphenyl in the second mass spectrometry. In FIG. 1, the calibration data is shown as data corresponding to a calibration curve for the sake of clarity. In a graph showing the calibration curve, a horizontal axis represents the concentration of a reference sample, and a vertical axis represents the intensity when the reference sample is detected. The form of the calibration data is not particularly limited as long as the concentration of a chlorobiphenyl in the analysis sample can be calculated from the intensity of the chlorobiphenyl obtained by mass spectrometry with the use of a correspondence relationship shown in the calibration data. The calibration data may be, for example, data corresponding to a calibration curve at one point or two or more points or a relative response factor between a substance used as a reference (hereinafter referred to as a reference substance) and a chlorobiphenyl.

When a relative response factor is used as the calibration data, a reference substance to be appropriately used is not particularly limited, but may be, for example, a decachlorobiphenyl. The relative response factor is represented as the ratio of the response factor of a chlorobiphenyl with respect to the response factor of a reference substance. The response factor is the ratio of a detected intensity obtained by performing mass spectrometry on a reference sample or an analysis sample with respect to a concentration in the reference sample or the analysis sample. The relative response factor is relatively constant per product or individual device. Therefore, when a chlorobiphenyl and a reference substance having a known concentration are measured in the second mass spectrometry, the concentration of the chlorobiphenyl can be calculated from the concentration and detected intensity of the reference substance, the detected intensity of the chlorobiphenyl, and a relative response factor obtained in the first mass spectrometry.

Calibration data about a reference sample Sn containing a chlorobiphenyl having n chlorine atom(s) is referred to as nth calibration data. FIG. 1 shows a point when the first mass spectrometry is performed on a first reference sample S1 to detect a monochlorobiphenyl Cr1 to prepare first calibration data (arrow A11). Further, FIG. 1 also shows a point when the first mass spectrometry is performed on a second reference sample S2 to detect a dichlorobiphenyl Cr2 to prepare second calibration data (arrow A12), and a point when the first mass spectrometry is performed on a ninth reference sample S9 to detect a nonachlorobiphenyl Cr9 to prepare ninth calibration data (arrow A19). Also, as for each n from 3 to 8, the first mass spectrometry is performed on an nth reference sample Sn to detect a chlorobiphenyl having n chlorine atoms to prepare nth calibration data.

It is to be noted that the first mass spectrometry may be performed on a reference sample containing two or more kinds of chlorobiphenyls different in the number of chlorine atoms contained to simultaneously detect these chlorobiphenyls to prepare calibration data.

Individual chlorobiphenyls different in chlorine number n (n=1 to 9) have isomers different in the position(s) of a chlorine atom(s). In the mass spectrometry method according to the present embodiment, it is not necessary to prepare nth calibration data corresponding to all the isomers for each n as long as nth calibration data about at least one chlorobiphenyl is prepared for each n. As for a chlorobiphenyl for which calibration data has not been prepared, calibration is performed in the second mass spectrometry using the calibration data of a chlorobiphenyl having the same number of chlorine atoms. Therefore, from the viewpoint of efficiently performing mass spectrometry, the number of kinds of chlorobiphenyls detected in the first mass spectrometry is preferably smaller than that detected in the second mass spectrometry.

When another substance is subjected to mass spectrometry simultaneously with chlorobiphenyls in the second mass spectrometry, the first mass spectrometry is performed on a reference sample of the substance to acquire calibration data. This calibration data may be, for example, a calibration curve or a relative response factor as in the case of a chlorobiphenyl.

Second Mass Spectrometry

Figure 2:
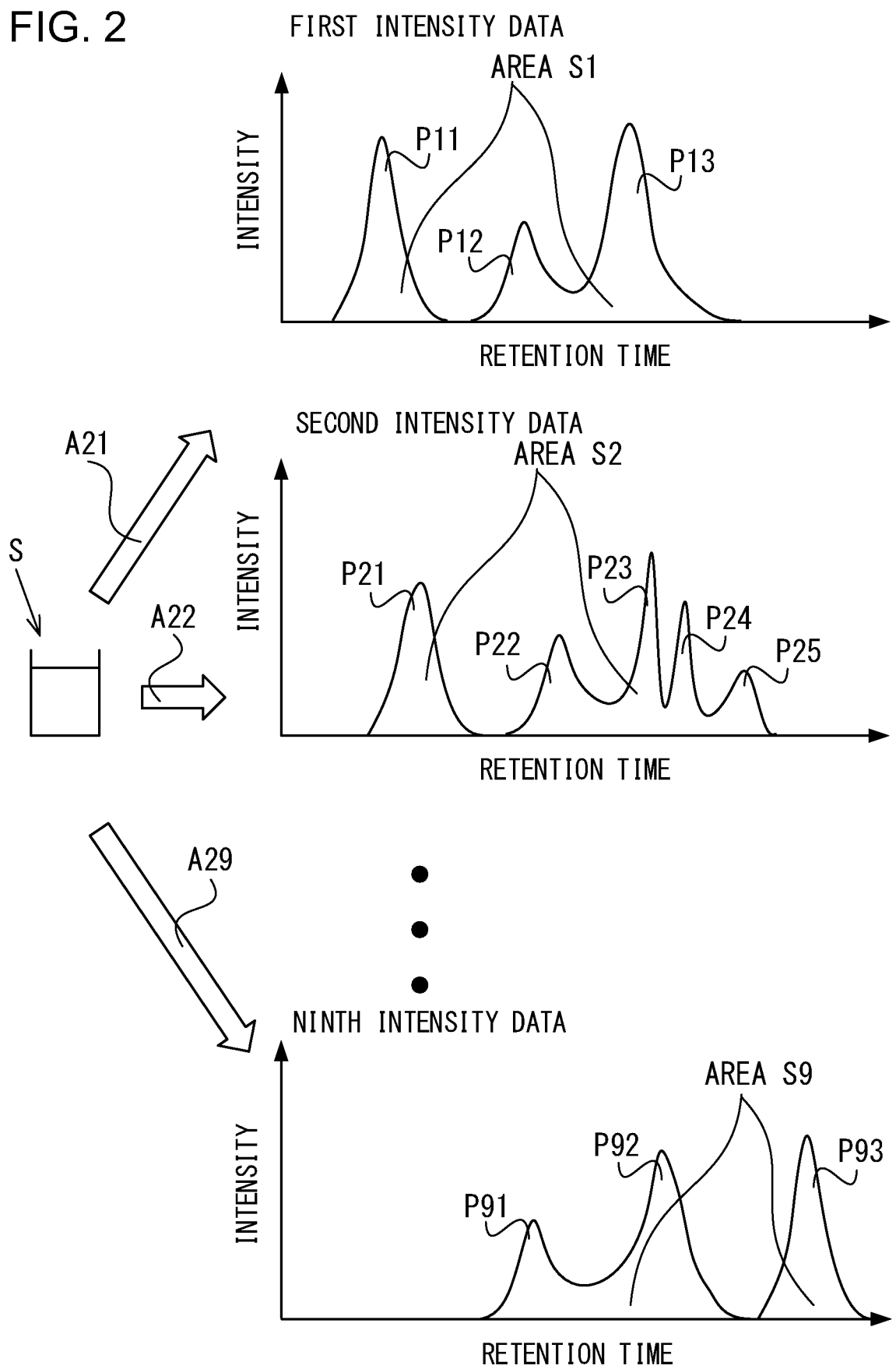
FIG. 2 is a conceptual diagram for explaining the mass spectrometry method according to the embodiment.

FIG. 2 is a conceptual diagram for explaining the second mass spectrometry. In the second mass spectrometry, mass spectrometry is performed on an analysis sample S so that two or more kinds of chlorobiphenyls having the same number of chlorine atoms are mass-separated under the same conditions for m/z. The second mass spectrometry is preferably performed by a tandem mass spectrometry. This makes it possible to simultaneously detect a substance having an m/z value substantially the same as that of an ion derived from a chlorobiphenyl. For example, in the first step of mass separation, chlorobiphenyls can be mass-separated using a difference in mass caused by a difference in the number of chlorine atoms. Then, ions derived from the mass-separated chlorobiphenyls are dissociated, and fragment ions characteristic of chlorobiphenyls can be mass-separated and detected in the second step of mass separation. In this case, the phrase "the same conditions for m/z" refers to a combination of the m/z of ions mass-separated in the first step and the m/z of fragment ions mass-separated in the second step, and corresponds to a so-called transition.

It is to be noted that a method for the mass spectrometry is not particularly limited as long as chlorobiphenyls having n chlorine atom(s) can be mass-separated and detected per each n with desired accuracy. For example, the mass spectrometry may be performed in three or more steps.

By the second mass spectrometry of the analysis sample S, data about m/z values and detected intensities corresponding to the m/z values (hereinafter referred to as intensity data; intensity data about chlorobiphenyls having n chlorine atom(s) is referred to as nth intensity data) is prepared. The intensity data is, for example, data corresponding to a chromatogram (mass chromatogram) showing a temporary change in the detected intensity of an ion at a predetermined m/z value. FIG. 2 shows examples of mass chromatograms of ions derived from monochlorobiphenyls, dichlorobiphenyls, and nonachlorobiphenyls respectively. In the mass chromatograms, a horizontal axis represents retention time in GC/MS or LC/MS, and a vertical axis represents the detected intensity of an ion derived from a detected chlorobiphenyl. Chlorobiphenyls different in the number of chlorine atoms contained are detected separately from each other by mass separation. The intensity data includes the detected intensity of at least one chlorobiphenyl that has the same chlorine number n as and is different in kind from a chlorobiphenyl detected in the first mass spectrometry.

By the second mass spectrometry of monochlorobiphenyls, first intensity data obtained by detecting two or more kinds of monochlorobiphenyls is prepared (arrow A21). In the mass chromatogram corresponding to the first intensity data, peaks P11, P12, and P13 are shown which correspond to the different monochlorobiphenyls. By the second mass spectrometry of dichlorobiphenyls, second intensity data obtained by detecting two or more kinds of dichlorobiphenyls is prepared (arrow A21). In the mass chromatogram corresponding to the second intensity data, peaks P21, P22, P23, P24, and P25 are shown which correspond to the different dichlorobiphenyls. By the second mass spectrometry of nonachlorobiphenyls, ninth intensity data obtained by detecting two or more kinds of nonachlorobiphenyls is prepared (arrow A29). In the mass chromatogram corresponding to the ninth intensity data, peaks P91, P92, and P93 are shown which correspond to the different nonachlorobiphenyls. Also, as for each n from 3 to 8, nth intensity data is prepared by the second mass spectrometry. The number of peaks shown in each of the mass chromatograms in FIG. 2 may be smaller than that theoretically detected for the sake of clarity, but the present invention is not limited to the form of the mass chromatograms shown in FIG. 2.

After the nth intensity data is prepared for each chlorine number n, an intensity corresponding to all the chlorobiphenyls of each n is calculated. This intensity is referred to as a total intensity, and the total intensity calculated from the nth intensity data is referred to as an nth total intensity. When the nth intensity data corresponds to a chromatogram, the nth total intensity is calculated as the sum of areas of all the peaks corresponding to the chlorobiphenyls in the chromatogram. In the case of the examples shown in FIG. 2, an area S1 corresponding to the peaks P11, P12, and P13 is calculated from the first intensity data, an area S2 corresponding to the peaks P21, P22, P23, P24, and P25 is calculated from the second intensity data, and an area S9 corresponding to the peaks P91, P92, and P93 is calculated from the ninth intensity data.

It is to be noted that the nth total intensity may be calculated by, for example, integrating not the areas of individual peaks but the peak intensities of individual peaks.

After the nth total intensity is calculated for each n, the quantitative value of chlorobiphenyls containing n chlorine atom(s) is calculated on the basis of the nth total intensity and the nth calibration data. This quantitative value indicates the abundance of chlorobiphenyls containing n chlorine atom(s) contained in the analysis sample S, and is typically a concentration value.

After the quantitative value is calculated for each n, the relative amount of chlorobiphenyls having a chlorine number n is calculated for each n on the basis of the quantitative value. Here, the relative amount indicates how much one or two or more chlorobiphenyls is/are contained with respect to the total amount of chlorobiphenyls in the analysis sample S or other one or two or more chlorobiphenyls.

FIG. 3 is a conceptual diagram for explaining the calculation of the relative amount. From the nth total intensity and the nth calibration data, the total concentration of chlorobiphenyls containing n chlorine atom(s) is calculated. The total concentration of chlorobiphenyls containing x chlorine atom(s) in the analysis sample S is defined as C(s)CBx. In this case, the ratio R(s)CBx of the amount of the chlorobiphenyls containing x chlorine atom(s) with respect to the total amount of chlorobiphenyls in the analysis sample S is represented by the following formula (1). In the formula (1), Sigma means a sum where x is from 1 to 9.

[Math. 1]

$$R(s)_{CBx} = \frac{C(s)_{CBx}}{\sum_x C(s)_{CBx}} \quad (1)$$

In FIG. 3, an arrow A31 schematically shows a point when the ratio R(s)CBn is calculated for each n (from 1 to 9) from the area Sn corresponding to the nth total intensity and the nth calibration data. Examples of the calculated ratios R(s)CBn are shown in Table A. Hereinafter, the calculated ratio R(s)CBx is simply referred to as a ratio R.

After the ratio R of chlorobiphenyls having a chlorine number n contained in the analysis sample S is calculated for each n, what chlorobiphenyl product is contained in the analysis sample S is identified from these ratios and reference data. The reference data is data that indicates the ratios of chlorobiphenyls having a chlorine number n in individual chlorobiphenyl products. An example of the contents of the reference data is shown in Table B in FIG. 3. Table B shows the ratios of the amounts of chlorobiphenyls whose number of chlorine atoms contained is any one of 1 to 9 with respect to the total amount of chlorobiphenyls in individual products A, B, C, D, E, F, and G. The format or style of the reference data is not particularly limited as long as the above-described ratios in products are shown.

The identification of what chlorobiphenyl product is contained in the analysis sample S is performed by calculating the degree of similarity SI from the calculated ratios R of chlorobiphenyls and the ratios of chlorobiphenyls in individual chlorobiphenyl products shown in the reference data (arrow A32). The degree of similarity SI is an index indicating which of the compositions of the individual chlorobiphenyl products is similar to the composition of chlorobiphenyls contained in the analysis sample S. The degree of similarity SI is represented by the following formula (2) on the basis of a difference between the calculated ratios R of chlorobiphenyls having a chlorine number n and the ratios of chlorobiphenyls having a chlorine number n in each of the chlorobiphenyl products in the reference data. Here, R(r)CBx refers to the ratio of the amount of all the chlorobiphenyls containing x chlorine atom(s) with respect to the total amount of chlorobiphenyls in the chlorobiphenyl product as a target for comparison in the reference data. In the formula (2), Sigma means a sum where x is from 1 to 9.

[Math. 2]

$$SI = \left[1 - \frac{\sum_x |R(s)_{CBx} - R(r)_{CBx}|}{\sum_x \{R(s)_{CBx} + R(r)_{CBx}\}}\right] \times 100 \quad (2)$$

The chlorobiphenyl product whose ratios of chlorobiphenyls show the highest degree of similarity SI with the calculated ratios R of chlorobiphenyls is identified as a chlorobiphenyl product contained in the analysis sample S.

It is to be noted that the identification of what chlorobiphenyl product is contained in the analysis sample S may be performed using an index other than the degree of similarity. For example, an index indicating how much the ratios R of chlorobiphenyls in the analysis sample S are different from the ratios of chlorobiphenyls in each of the chlorobiphenyl products shown in the reference data may be calculated. In this case, the chlorobiphenyl product showing the lowest index is identified as a chlorobiphenyl product contained in the analysis sample S.

The concentration of chlorobiphenyls contained in the chlorobiphenyl product is obtained as a sum determined by adding up the total concentrations of chlorobiphenyls having each chlorine number n from 1 to 9.

In the second mass spectrometry, chlorobiphenyls and substances other than the chlorobiphenyls can be subjected to mass spectrometry at the same time. The phrase "mass spectrometry at the same time" means that two more kinds of substances are simultaneously analyzed in mass spectrometry. The substances may be those toxic to living organisms or may be those having insecticidal effect or those used as insecticides. This makes it possible to determine at the same time the presence or absence of a larger number of such substances toxic to living organisms including chlorobiphenyls in, for example, an environment or a product from which the analysis sample S is derived.

Mass Spectrometry device

Figure 4:
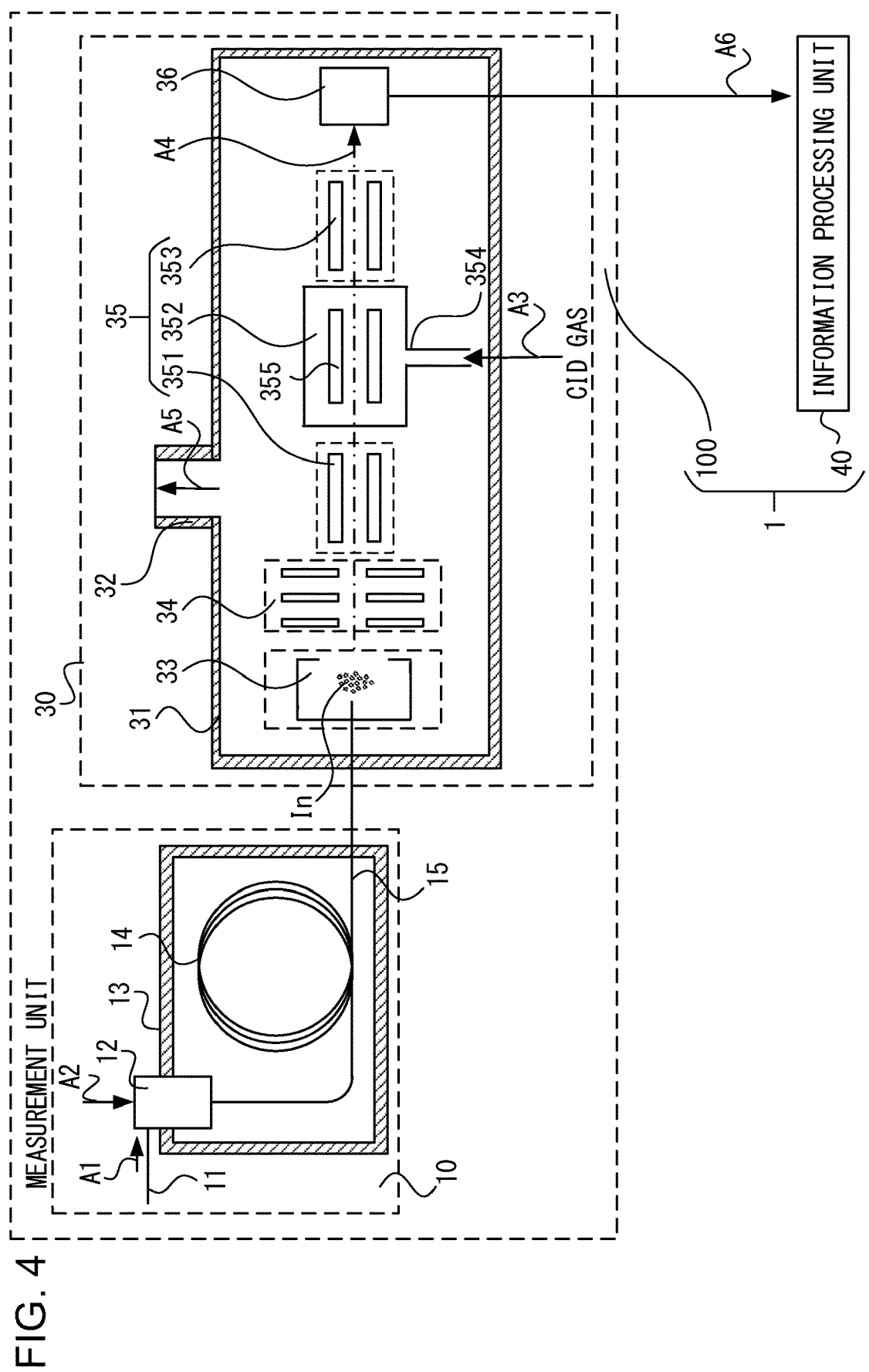
FIG. 4 is a conceptual diagram showing the structure of a mass spectrometry device.

FIG. 4 is a conceptual diagram showing the structure of a mass spectrometry device according to the present embodiment. A mass spectrometry device 1 is a gas chromatograph-mass spectrometer (hereinafter referred to as GC-MS), and includes a measurement unit 100 and an information processing unit 40. The measurement unit 100 includes a gas chromatograph 10 and a mass spectrometry section 30.

It is to be noted that the type of the mass spectrometry device is not particularly limited as long as chlorobiphenyls can be separated with desired accuracy, and for example, a mass spectrometry device having no chromatograph or a liquid chromatograph-mass spectrometer (LC-MS) may appropriately be used.

The gas chromatograph 10 includes a carrier gas channel 11, a sample introduction part 12, a column temperature adjusting part 13, a separation column 14, and a sample gas introduction tube 15. The mass spectrometry section 30 includes a vacuum container 31, an exhaust port 32, an ionization part 33 configured to ionize a sample such as an analysis sample S and a reference sample to generate ions In, an ion adjusting part 34, a mass separation part 35, and a detection part 36. The mass separation part 35 includes a first mass separation part 351, a collision cell 352, and a second mass separation part 353. The collision cell 352 includes a CID gas introduction port 354 and an ion guide 355.

The measurement unit 100 separates individual components (hereinafter referred to as sample components), such as chlorobiphenyls, contained in a sample such as an analysis sample S or a reference sample and detects the individual separated sample components.

The gas chromatograph 10 functions as a separation section that separates the sample components on the basis of physical or chemical properties. The sample introduced into the separation column 14 is in a gas or gas-like state, and such a sample is referred to as a sample gas.

The carrier gas channel 11 has a first end as one end thereof and a second end as the other end thereof, and the first end is connected to a carrier gas supply source (not shown) so that a carrier gas can flow through the carrier gas channel 11 and the second end is connected to the sample introduction part 12 so that the carrier gas can be introduced into the sample introduction part 12. The carrier gas, such as helium, introduced from the carrier gas supply source into the carrier gas channel 11 is introduced into the sample introduction part 12 (arrow A1) after the flow rate or the like of the carrier gas is adjusted by a flow rate control part (not shown) provided in the middle of the carrier gas channel 11. The sample introduction part 12 includes a chamber in which a sample is to be placed, such as a sample vaporizing chamber, to temporarily store the sample injected by an injector (not shown) such as a syringe or an autosampler and vaporize the sample when the sample is liquid so that a sample gas is introduced into the separation column 14 (arrow A2).

The separation column 14 includes a column such as a capillary column. The temperature of the separation column 14 is controlled to be, for example several hundreds degrees Celsius or lower by the column temperature adjusting part 13 including a column oven or the like. The individual components of the sample gas are separated on the basis of, for example, a partition coefficient between a mobile phase and a stationary phase of the separation column 14. The separated individual components of the sample gas are eluted from the separation column 14 at different time points and introduced into the ionization part 33 of the mass spectrometry section 30 through the sample gas introduction tube 15.

The mass spectrometry section 30 includes a mass spectrometer, and ionizes the sample gas introduced into the ionization part 33 to mass-separate and detect ions In generated by the ionization. The pathway of the ions In derived from the sample and generated by the ionization part 33 is schematically shown by an arrow A4.

It is to be noted that the type of the mass spectrometer constituting the mass spectrometry section 30 is not particularly limited as long as the ions In can be mass-separated with desired accuracy and ions obtained by the mass separation can be detected, and the mass spectrometer may include any type of mass analyzer.

The vacuum container 31 of the mass spectrometry section 30 includes the exhaust port 32. The exhaust port 32 is connected to a vacuum evacuation system (not shown) so that evacuation can be performed. The vacuum evacuation system includes a pump that can produce a high vacuum of, for example, $10^{-2}$ Pa or less, such as a turbo-molecular pump, and an auxiliary pump thereof. In FIG. 4, a point where gas inside the vacuum container 31 is discharged is schematically shown by an arrow A5.

The ionization part 33 of the mass spectrometry section 30 includes an ion source and ionizes the sample gas introduced into the ionization part 33 by, for example, electronic ionization or chemical ionization to generate ions In. The ions In generated by the ionization part 33 are introduced into the ion adjusting part 34.

It is to be noted that a method for ionization by the ionization part 33 is not particularly limited as long as ionization can be performed with desired efficiency. In the case of LC/MS, for example, an electrospray method can appropriately be used.

The ion adjusting part 34 of the mass spectrometry section 30 includes an ion transporting system such as lens electrodes or an ion guide and adjusts the ions In by, for example, converging the flux of the ions In by electromagnetic action. The ions In emitted from the ion adjusting part 34 are introduced into the first mass separation part 351 of the mass separation part 35.

The first mass separation part 351 allows the ions In having an m/z value set by electromagnetic action based on a voltage applied to a quadrupole to selectively pass through it as precursor ions to emit the ions In toward the collision cell 352.

The collision cell 352 dissociates the ions In by collision-induced dissociation (CID) while controlling the movement of the ions In by the ion guide 355 to generate fragment ions. A gas containing argon, nitrogen, or the like with which the ions are to be collided during CID (hereinafter referred to as a CID gas) is introduced into a CID gas introduction port 241 to achieve a predetermined pressure in the collision cell (arrow A3). The ions In derived from the sample and containing the generated fragment ions are emitted toward the second mass separation part 353.

It is to be noted that a method for dissociation is not particularly limited as long as the ions In derived from the sample can be mass-separated and detected with desired accuracy, and for example, infrared multiphoton dissociation, photoinduced dissociation, and dissociation using radicals may appropriately be used.

The second mass separation part 353 allows the ions In having an m/z value set by electromagnetic action based on a voltage applied to a quadrupole to selectively pass through it to emit the ions In toward the detection part 36.

The detection part 36 of the mass spectrometry section 30 includes an ion detector such as a secondary electron multiplier or a photoelectron multiplier to detect the incident ions In. In the detection part 36, an A/D converter (not shown) A/D-converts detected signals obtained by detection of the incident ions In, and digitized detected signals are output as measured data to the information processing unit 40 (arrow A6).

Figure 5:
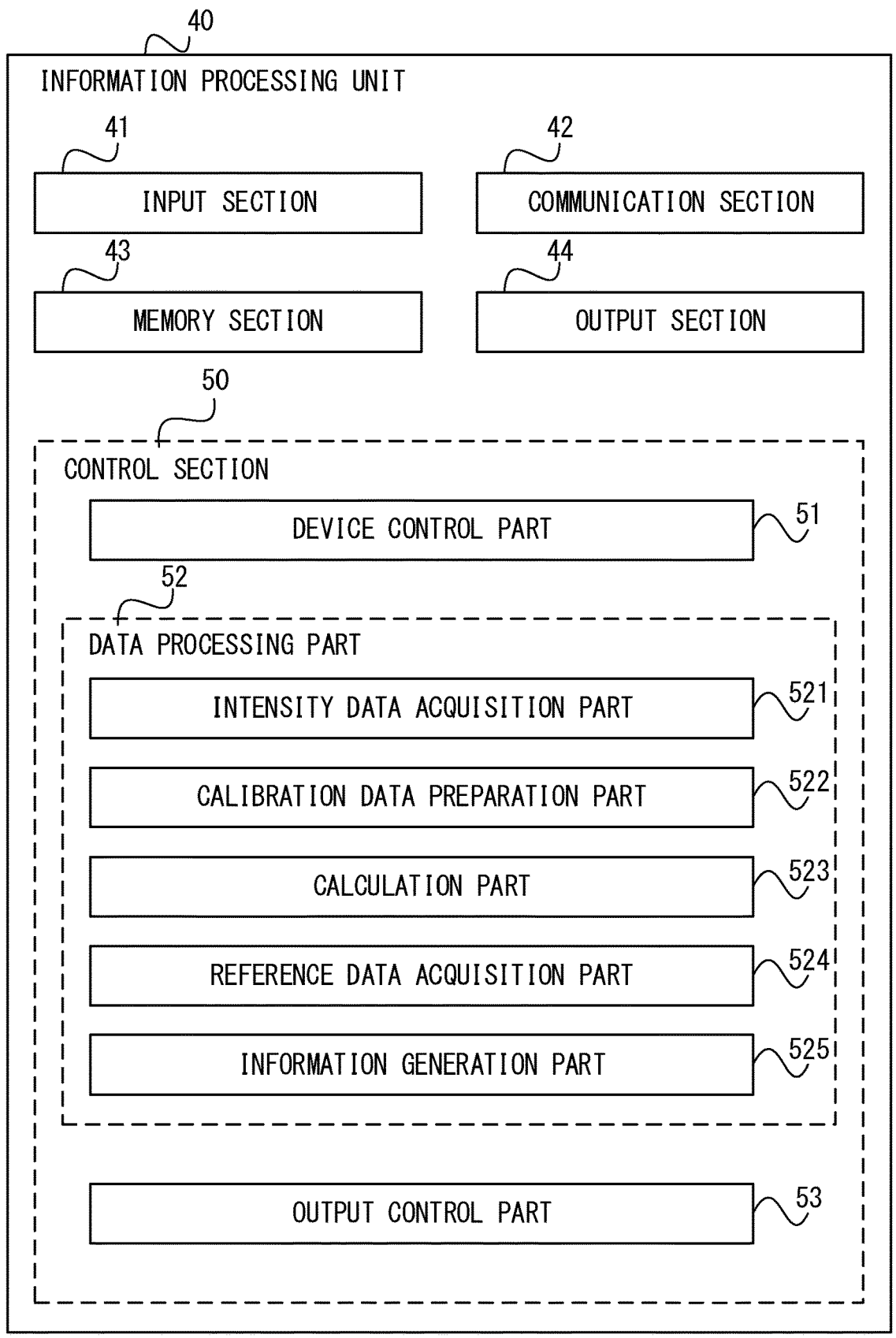
FIG. 5 is a conceptual diagram showing the structure of an information processing unit.

FIG. 5 is a conceptual diagram showing the structure of the information processing unit 40. The information processing unit 40 includes an input section 41, a communication section 42, a memory section 43, an output section 44, and a control section 50. The control section 50 includes a device control part 51, a data processing part 52, and an output control part 53. The data processing part 52 includes an intensity data acquisition part 521, a calibration data preparation part 522, a calculation part 523, a reference data acquisition part 524, and an information generation part 525.

The information processing unit 40 includes an information processing device such as an computer, functions as an interface with a user of the mass spectrometry device 1

(hereinafter simply referred to as a "user"), and performs processing on various data, such as communication, storage, and calculation.

It is to be noted that the measurement unit 100 and the information processing unit 40 may be provided as an integrated system.

The input section 41 includes an input device such as a mouse, a keyboard, various buttons, or a touch panel. The input section 41 receives, for example, information required to control the measurement unit 100 or to allow the control section 50 to perform processing from a user. The communication section 42 includes a communication device capable of performing wireless or wire communication such as the Internet, and appropriately sends and receives, for example, data about control of the measurement unit 100 or processing performed by the control section 50.

The memory section 43 includes a non-volatile memory medium, and stores, for example, programs and data for allowing the control section 50 to perform processing and measured data obtained by detection performed by the detection part 36. The output section 44 includes, for example a display device such as a liquid crystal monitor or a printer. The output section 44 outputs, for example, information about processing performed by the control section 50 by displaying the information on the display device or printing the information by the printer.

The control section 50 includes a processing device such as a CPU (Central Processing Unit), and the processing device performs main operations of the mass spectrometry device 1, such as control of the measurement unit 100 and processing of measured data.

The device control part 51 of the control section 50 controls the operations of individual parts of the measurement unit 100. For example, the device control part 51 changes the voltages of the quadrupoles in the first mass separation part 351 and the second mass separation part 353 so that the ions In having an m/z value set on the basis of, for example, an input from the input section 41 selectively pass through the first mass separation part 351 and the second mass separation part 353.

The data processing part 52 of the control section 50 processes measured data and performs data analysis. In the data analysis, the relative amounts of two or more kinds of chlorobiphenyls contained in the analysis sample S are calculated and a chlorobiphenyl product contained in the analysis sample S is identified.

The intensity data acquisition part 521 of the data processing part 52 acquires reference sample intensity data or intensity data by preparing from measured data. The intensity data acquisition part 521 allows a memory (not shown) communicably connected to the memory section 43 or the CPU of the control section 50 to store (hereinafter described as "allows the mass spectrometry device 1 to store") the acquired reference sample intensity data and intensity data to be referable.

The intensity data acquisition part 521 acquires data corresponding to a chromatogram (hereinafter referred to as chromatogram data) as the reference sample intensity data by preparing from measured data obtained by the first mass spectrometry.

The intensity data acquisition part 521 acquires chromatogram data as the intensity data by preparing from measured data obtained by the second mass spectrometry. The intensity data acquisition part 521 acquires, for each n (n ranges from 1 to 9), nth intensity data obtained by detecting two or more kinds of chlorobiphenyls containing n chlorine atom(s) contained in the analysis sample S in the second mass spectrometry.

The calibration data preparation part 522 of the data processing part 52 prepares nth calibration data for each n (n ranges from 1 to 9) on the basis of nth reference sample intensity data obtained by detecting a chlorobiphenyl having n chlorine atom(s) in the first mass spectrometry of the nth reference sample Sn. The calibration data preparation part 522 allows the mass spectrometry device 1 to store the prepared calibration data.

The calibration data preparation part 522 calculates the area of a peak or a peak intensity corresponding to the reference sample in the chromatogram from the reference sample intensity data as a detected intensity of the reference sample. The calibration data preparation part 522 prepares, as calibration data, data corresponding to a calibration curve from the known concentration of the nth reference sample acquired by, for example, input from the input section 41 and the calculated detected intensity.

It is to be noted that, as described above, the calibration data preparation part 522 may prepare calibration data using a relative response factor. In this case, the calibration data preparation part 522 may calculate the detected intensity of a reference substance from measured data and acquire the known concentration of the reference substance from, for example, the input section to calculate a relative response factor.

The calculation part 523 of the data processing part 52 calculates the ratio R of the amount of two or more kinds of chlorobiphenyls containing n chlorine atom(s) with respect to the total amount of chlorobiphenyls on the basis of the calibration data and the intensity data. The calculation part 523 calculates, for each n, the concentration of chlorobiphenyls containing n chlorine atom(s) from the nth intensity data and the nth calibration data. The calculation part 523 calculates the ratio R from the calculated concentration by the formula (1). The calculation part 523 allows the mass spectrometry device 1 to store the calculated concentration and ratio R.

The reference data acquisition part 524 of the data processing part 52 acquires reference data including the ratios of chlorobiphenyls in chlorobiphenyl products from, for example, the input section 41, the communication section 42, or the memory section 43. The reference data shows the ratios of the amounts of all the two or more kinds of chlorobiphenyls containing n chlorine atom(s) with respect to the total amount of chlorobiphenyls. The reference data acquisition part 524 may acquire the above-described ratios by calculating from data about the compositions of chlorobiphenyls in chlorobiphenyl products. The reference data acquisition part 524 allows the mass spectrometry device 1 to store the acquired reference data.

The information generation part 525 generates information showing which of the chlorobiphenyl products is contained in the analysis sample S on the basis of the reference data and the ratios R of two or more kinds of chlorobiphenyls containing n chlorine atom(s) calculated by the calculation part 523. The information generation part 525 calculates the degree of similarity SI between the composition of chlorobiphenyls contained in the analysis sample S and the composition of each of the chlorobiphenyl products, according to the formula (2). The information generation part 525 identifies a chlorobiphenyl product showing the highest degree of similarity SI as a chlorobiphenyl product contained in the analysis sample S.

The information generation part 525 generates information about the identified chlorobiphenyl product. The generated information may include the degree of similarity SI or information obtained by the first mass spectrometry or the second mass spectrometry, such as chromatograms, in addition to the product number or name of the chlorobiphenyl product. The information generation part 525 allows, for example, the memory section 43 to store the generated information.

The output control part 53 creates an output image including the information generated by the information generation part 525. The output control part 53 controls the output section 44 to output the output image.

Mass Spectrometry Method

Figure 6:
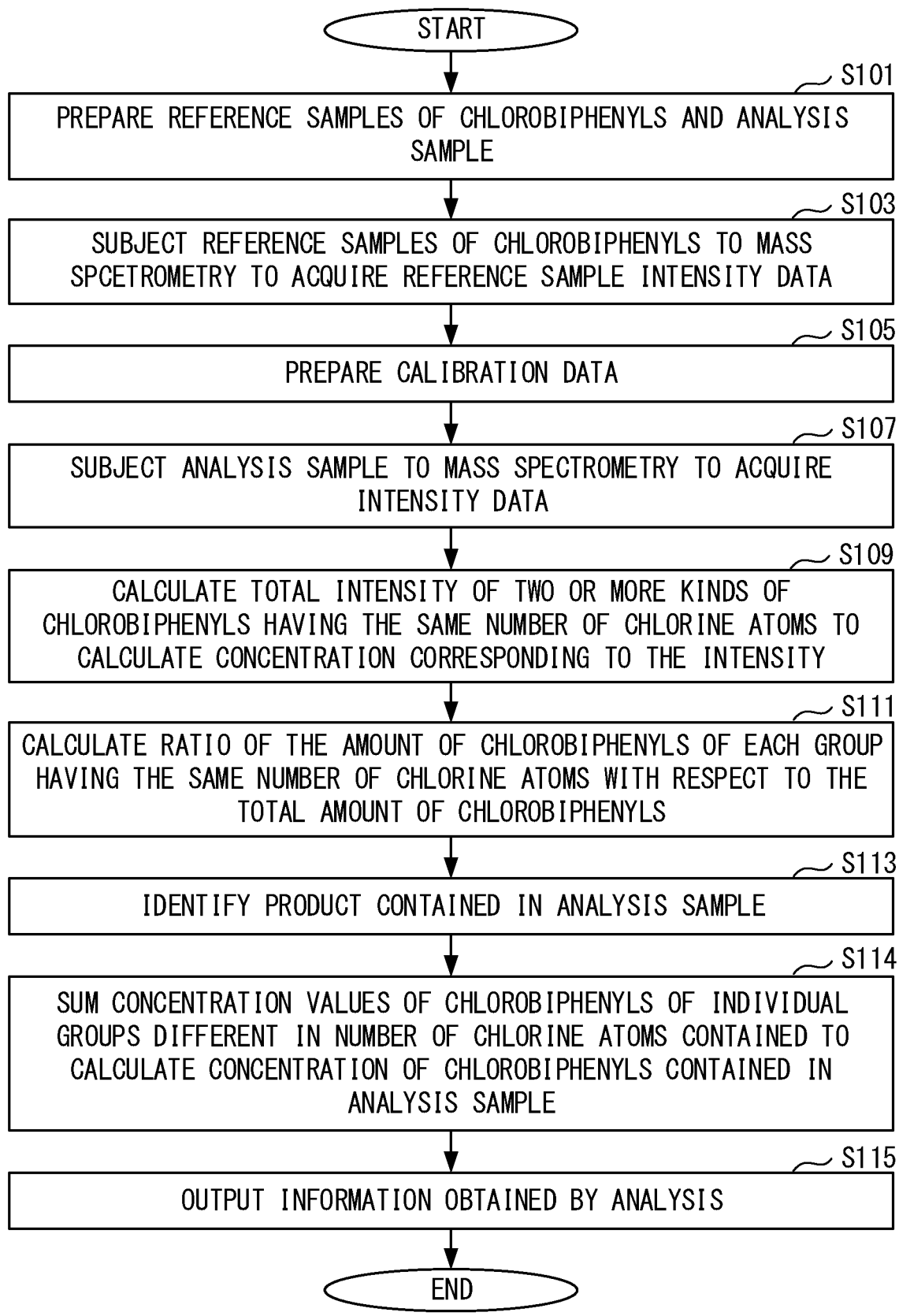
FIG. 6 is a flow chart showing the procedure of the mass spectrometry method according to the embodiment.

FIG. 6 is a flow chart showing the procedure of a mass spectrometry method according to the present embodiment. In Step S101, reference samples Sn of chlorobiphenyls and an analysis sample S are prepared. When Step S101 is completed, Step S103 starts. In Step S103, the mass spectrometry device 1 performs mass spectrometry on the reference samples Sn of chlorobiphenyls, and the intensity data acquisition part 521 acquires reference sample intensity data. When Step S103 is completed, Step S105 starts.

In Step S105, the calibration data preparation part 522 prepares calibration data. When Step S105 is completed, Step S107 starts. In Step S107, the mass spectrometry device 1 performs mass spectrometry on the analysis sample S to acquire intensity data. When Step S107 is completed, Step S109 starts.

In Step S109, the calculation part 523 calculates the total intensity of two or more kinds of chlorobiphenyls containing the same number of chlorine atom(s) to calculate a concentration corresponding to the intensity. In Step S109, when the analysis sample S contains chlorobiphenyls different in the number of chlorine atoms contained, the total intensity of chlorobiphenyls is calculated for each different chlorine number to calculate the concentration of chlorobiphenyls corresponding to the total intensity for each chlorine number. When Step S109 is completed, Step S111 starts. In Step S111, the calculation part 523 calculates the ratio R of the amount of chlorobiphenyls of each group having the same number of chlorine atoms with respect to the total amount of chlorobiphenyls. When Step S111 is completed, Step S113 starts.

In Step S113, the information generation part 52 identifies a chlorobiphenyl product contained in the analysis sample S. When Step S113 is completed, Step S114 starts. In Step S114, the individual concentrations of chlorobiphenyls calculated in Step S109 are added to calculate the concentration of chlorobiphenyls contained in the analysis sample S. The concentrations of chlorobiphenyls added in Step S114 are typically measured concentrations of chlorobiphenyls of all the chlorine numbers, but may be concentrations of any kinds of chlorobiphenyls or concentrations of chlorobiphenyls of any combination. When Step S114 is completed, Step S115 starts. In Step S115, the output control part 53 allows the output section 44 to output information obtained by analysis. When Step S115 is completed, processing is completed.

Modifications which will be described below are also included in the scope of the present invention, and may be combined with the above-described embodiment. In the following modified examples, parts etc. having the same structure and function as those in the above-described embodiment are denoted by the same reference signs, and description thereof will not be repeated.

MODIFIED EXAMPLE 1

In the above-described embodiment, the calculation part 523 calculates the ratio R of two or more kinds of chlorobiphenyls having n chlorine atoms(s) with respect to the total amount of chlorobiphenyls contained in the analysis sample S. However, the calculation part 523 may calculate, as the above-described relative amount, the ratio between the amount of two or more kinds of chlorobiphenyls having n chlorine atom(s) and the amount of any kind of chlorobiphenyl or any kinds of chlorobiphenyls and the amount of any combination of chlorobiphenyls or any combinations of chlorobiphenyls. For example, the ratio between the amount of all the chlorobiphenyls having n chlorine atom(s) and the amount of all the chlorobiphenyls having m chlorine atom(s) may be calculated to compare the amounts of chlorobiphenyls of both the groups.

MODIFIED EXAMPLE 2

In the above-described embodiment, when the analysis sample S contains two or more chlorobiphenyl products, the chlorobiphenyl products can be identified in the following manner.

The reference data acquisition part 524 calculates the composition of chlorobiphenyls in a mixed product obtained by mixing chlorobiphenyl products included in the reference data in a predetermined ratio.

In FIG. 7, Table C shows the ratios of the amounts of all the chlorobiphenyls containing the same number of chlorine atoms with respect to the total amount of chlorobiphenyls in each mixed product "A+B", "A+C", "A+D", "A+E", "A+F", or "A+G" containing the product A and any one of the products B to G shown in FIG. 3 in a ratio of 1:1. The reference data acquisition part 524 calculates each value shown in table C as an arithmetic mean of a corresponding value in the product A and a corresponding value in each of the products B to G. The reference data acquisition part 524 calculates the compositions of chlorobiphenyls in the same manner for mixed products obtained by mixing products in various ratios, and allows the mass spectrometry device 1 to store them as reference data. The compositions of chlorobiphenyls may be calculated for mixed products obtained by mixing three or more chlorobiphenyl products.

The information generation part 525 calculates the degree of similarity SI between the ratios R of two or more kinds of chlorobiphenyls containing n chlorine atoms(s) calculated by the calculation part 523 and the ratios for the chlorobiphenyl products and the mixed products thereof shown in the reference data. The information generation part 525 calculates the degree of similarity SI from the formula (2) wherein $R(r)CBx$ represents the ratio of the amount of all the chlorobiphenyls containing x chlorine atom(s) with respect to the total amount of chlorobiphenyls of the chlorobiphenyl product or the mixed product shown in the reference data. When a product showing the highest degree of similarity SI is a mixed product, the information generation part 525 identifies all the chlorobiphenyl products contained in the mixed product as chlorobiphenyl products contained in the analysis sample S. When a product showing the highest degree of similarity SI is a chlorobiphenyl product, the information generation part 525 identifies the chlorobiphenyl product as a chlorobiphenyl product contained in the analysis sample S.

MODIFIED EXAMPLE 3

In the above-described embodiment, a mass spectrometry kit for use in the mass spectrometry method according to the above-described embodiment may be used to prepare samples or perform operations in analysis. Such a mass spectrometry kit includes consumable items etc. necessary for the preparation of samples or operations in analysis.

MODIFIED EXAMPLE 4

It is available that a program for realizing the information processing function of the mass spectrometry device 1, that is, a program to perform control of processing of data processing part 52 described above and processing related thereto is recorded in a computer-readable recording medium and then the program is read and executed by a computer system. It is noted that the term "computer system" in this context may refer to an OS (operating system) or a peripheral device in hardware. In addition, the "computer-readable recording medium" may be a portable recording medium such as a flexible disk, a magneto-optical disk, an optical disk or a memory card, or it may be a storage device such as a hard disk built into the computer system. Furthermore, the "computer-readable recording medium" may be a medium that dynamically holds the program over a short period of time, e.g., a communication line through which the program is transmitted via a network such as the Internet or via a communication network such as a telephone network, or a medium that holds the program over a certain length of time, e.g., a volatile memory within a computer system functioning as a server or a client in the above case. Moreover, the program may allow only some of the functions described above to be fulfilled or the functions described above may be fulfilled by using the program in conjunction with a program pre-installed in the computer system.

Figure 8:
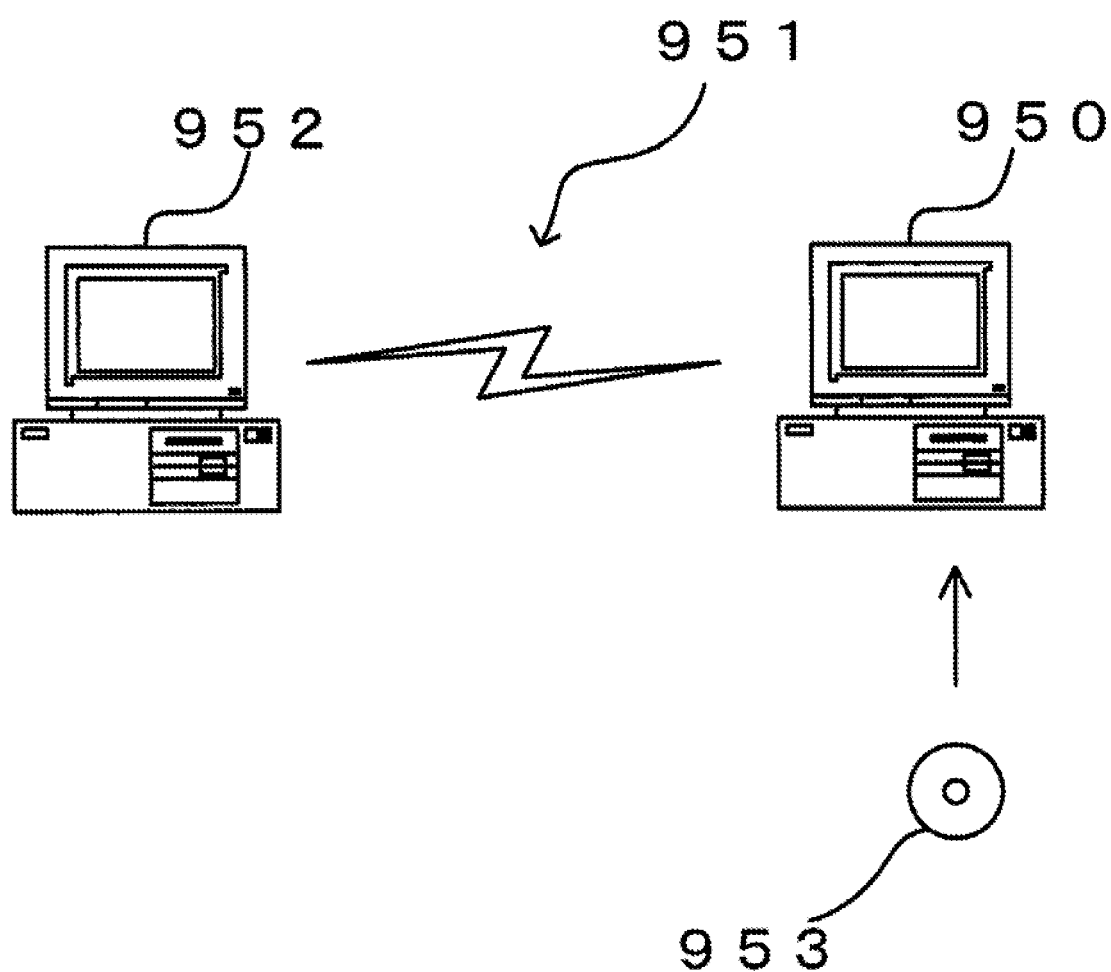
FIG. 8 is a conceptual diagram for explaining the provision of a program.

In addition, the present invention may be adopted in conjunction with a personal computer (hereafter referred to as a PC) or the like, and in such a case, the program pertaining to the control described above can be provided in a recording medium such as a CD-ROM or a DVD-ROM, or a data signal transmitted through the Internet or the like. FIG. 8 illustrates how such a program may be provided. A PC 950 receives the program via a CD-ROM 953. The PC 950 is also capable of connecting with a communication network 951. A computer 952 is a server computer that provides the program stored in a recording medium such as a hard disk. The communication network 951 may be a communication network such as the Internet or a personal computer communication network, or it may be a dedicated communication network. The computer 952 reads out the program from the hard disk and transmits it to the PC 950 via the communication network 951. In other words, the program may be delivered as a data signal carried on a carrier wave transmitted via the communication network 951. Namely, the program can be distributed as a computer-readable computer program product assuming any of various modes including a recording medium and a carrier wave.

Aspects

It will be understood by those skilled in the art that the above-described illustrative embodiment and modified examples are specific examples of the following aspects.

Item 1

A mass spectrometry method according to one aspect comprises: preparing calibration data for performing calibration on a basis of first data obtained by detecting a chlorobiphenyl in first mass spectrometry of a reference sample of the chlorobiphenyl; acquiring second data obtained by detecting, in second mass spectrometry of a sample, at least one chlorobiphenyl that has a same chlorine number as and is different in kind from the chlorobiphenyl detected in the first mass spectrometry; and calculating a quantitative value for the chlorobiphenyl contained in the sample on a basis of the calibration data and the second data. This makes it possible to efficiently perform mass spectrometry on a chlorobiphenyl-containing sample.

Item 2

A mass spectrometry method according to another aspect is the mass spectrometry method according to Item 1, wherein: the first data obtained by the first mass spectrometry includes data obtained by detecting two or more kinds of chlorobiphenyls different in chlorine number; and the second data obtained by the second mass spectrometry includes data obtained by detecting two or more kinds of chlorobiphenyls different in chlorine number contained in the sample. This makes it possible to efficiently perform data analysis on two or more kinds of chlorobiphenyls different in chlorine number.

Item 3

A mass spectrometry method according to another aspect is the mass spectrometry method according to Item 1 or 2, wherein: the second data obtained by the second mass spectrometry includes data obtained by detecting two or more kinds of chlorobiphenyls having a same chlorine number. This makes it possible to efficiently perform calibration of two or more kinds of chlorobiphenyls using corresponding calibration data.

Item 4

A mass spectrometry method according to another aspect is the mass spectrometry method according to Item 3, wherein: the detection in the second mass spectrometry includes detection of chlorobiphenyls whose number of kinds is larger than that of chlorobiphenyls having the chlorine number detected in the first mass spectrometry. This makes it possible to reduce time and effort required for preparing calibration curves or the like, thereby efficiently performing mass spectrometry on a sample containing two or more kinds of chlorobiphenyls.

Item 5

A mass spectrometry method according to another aspect is the mass spectrometry method according to Item 3 or 4, wherein: in the second mass spectrometry, the two or more kinds of chlorobiphenyls are mass-separated under same conditions for an m/z range of molecules to be mass-separated. This makes it possible to more accurately perform calibration of two or more kinds of chlorobiphenyls.

Item 6

A mass spectrometry method according to another aspect is the mass spectrometry method according to any one of Items 3 to 5, wherein: an intensity corresponding to all the two or more kinds of chlorobiphenyls having a same chlorine number contained in the sample is calculated on a basis of the second data; and the quantitative value is calculated on a basis of the calculated intensity and the calibration data. This makes it possible to efficiently perform mass spectrometry on a sample containing two of more chlorobiphenyls at a time.

Item 7

A mass spectrometry method according to another aspect is the mass spectrometry method according to Item 6, wherein: when a number of chlorine atoms contained in a chlorobiphenyl is defined as n, a quantitative value corresponding to all chlorobiphenyls containing n chlorine atom (s) is calculated for each of different values of n. This makes it possible to efficiently perform mass spectrometry on a sample containing chlorobiphenyls different in chlorine number at a time.

Item 8

A mass spectrometry method according to another aspect is the mass spectrometry method according to any one of Items 1 to 7, wherein: the calibration data is calibration data including a correspondence relationship between a concentration of the reference sample of the chlorobiphenyl and a detected intensity of the chlorobiphenyl; and the quantitative value is a concentration value of the chlorobiphenyl detected in the second mass spectrometry. This makes it possible to efficiently obtain the concentration of a chlorobiphenyl in a sample using mass spectrometry.

Item 9

A mass spectrometry method according to another aspect is the mass spectrometry method according to any one of Items 1 to 8, wherein: the calculation of a quantitative value includes calculation of a quantitative value for each of two or more kinds of chlorobiphenyls different in chlorine number detected in the second mass spectrometry, and the method includes calculation of a relative amount indicating a ratio of an amount of a chlorobiphenyl having a certain chlorine number detected in the second mass spectrometry with respect to an amount of at least one kind of chlorobiphenyl having another chlorine number detected in the second mass spectrometry or a total amount of chlorobiphenyls detected in the second mass spectrometry on a basis of the quantitative values of the chlorobiphenyls. This makes it possible to efficiently obtain information about the characteristics of a sample based on the ratios of individual chlorobiphenyls using mass spectrometry.

Item 10

A mass spectrometry method according to another aspect is the mass spectrometry method according to Item 9, which further includes: acquiring reference data including ratios of chlorobiphenyls different in chlorine number in a mixture containing two or more kinds of chlorobiphenyls different in chlorine number; and identifying a mixture of chlorobiphenyls contained in the sample on a basis of the reference data and the relative amounts. This makes it possible to provide information about a mixture contained in an analysis sample, thereby performing, for example, assessment of risks of chlorobiphenyls in, for example, an environment or a product from which the analysis sample is derived.

Item 11

A mass spectrometry method according to another aspect is the mass spectrometry method according to any one of Items 1 to 10, wherein: the calculation of a quantitative value includes calculation of a quantitative value for each of two or more kinds of chlorobiphenyls different in chlorine number detected in the second mass spectrometry; and a sum of quantitative values calculated for the individual two or more kinds of chlorobiphenyls different in chlorine number is calculated as a quantitative value for a mixture of chlorobiphenyls. This makes it possible to provide information about the total amount of chlorobiphenyls in a sample, thereby performing, for example, the above-described assessment of risks.

Item 12

A mass spectrometry device according to one aspect comprises: a calibration data preparation part configured to prepare calibration data for performing calibration on a basis of first data obtained by detecting a chlorobiphenyl in first mass spectrometry of a reference sample of the chlorobiphenyl; a data acquisition part (intensity data acquisition part 521) configured to acquire second data obtained by detecting at least one chlorobiphenyl that has a same chlorine number as and is different in kind from the chlorobiphenyl detected in the first mass spectrometry; and a calculation part configured to calculate a quantitative value of the chlorobiphenyl contained in the sample on a basis of the calibration data and the second data. This makes it possible to efficiently perform mass spectrometry on a chlorobiphenyl-containing sample.

Item 13

A program according to one aspect is a program for allowing a processing device to perform: calibration data preparation processing (corresponding to Step S105 in the flow chart shown in FIG. 6) in which calibration data for performing calibration is prepared on a basis of first data obtained by detecting a chlorobiphenyl in first mass spectrometry of a reference sample of the chlorobiphenyl; data acquisition processing (corresponding to Step S107 in the flow chart shown in FIG. 6) in which second data obtained by detecting, in second mass spectrometry of a sample, at least one chlorobiphenyl that has a same chlorine number as and is different in kind from the chlorobiphenyl detected in the first mass spectrometry is acquired; and calculation processing (corresponding to Steps S109, S111, and S114 in the flow chart shown in FIG. 6) in which a quantitative value of the chlorobiphenyl contained in the sample is calculated on a basis of the calibration data and the second data. This makes it possible to efficiently perform mass spectrometry on a chlorobiphenyl-containing sample.

Item 14

A mass spectrometry kit according to one aspect is a mass spectrometry kit for use in the mass spectrometry method according to any one of Items 1 to 11. This makes it possible to more efficiently perform mass spectrometry on a chlorobiphenyl-containing sample.

The present invention is not limited to the details of the above-described embodiment. Other aspects conceivable within the scope of the technical idea of the present invention are also included in the scope of the present invention.

EXAMPLES

Hereinbelow, examples according to the above-described embodiment are shown, but the present invention is not limited to specific devices and the like in the following examples.

Example 1

Samples containing a predetermined concentration of Aroclor were prepared. Aroclor is a product used as, for example, lubricant oil or insulating oil, and is produced by mixing chlorobiphenyls in a predetermined ratio. One kind of chlorobiphenyl was used as a reference sample for each n concerning chlorobiphenyls having n chlorine atom(s) (n=1 to 9). First mass spectrometry and second mass spectrometry were performed to quantify the concentration of Aroclor in each of the samples.

Samples were prepared which contained Aroclor 1016, Aroclor 1221, Aroclor 1232, Aroclor 1242, Aroclor 1248, Aroclor 1254, and Aroclor 1260 respectively. Two kinds of samples different in concentration were prepared for each Aroclor, one of which contained 10 ppb of Aroclor and the other of which contained 100 ppb of Aroclor. The concentration of Aroclor in each of the samples was quantified in the manner as described above three times by changing chlorobiphenyls used as reference samples. The reference samples used in the three quantifications were defined as Mix 1, Mix 2, and Mix 3. Mix 1, Mix 2, and Mix 3 are mixtures of chlorobiphenyls having chlorine numbers of 1 to 9, and are different in kinds of chlorobiphenyls used. For example, in the case of Mix 1, known compositions of Aroclor 1016, Aroclor 1221, Aroclor 1232, Aroclor 1242, Aroclor 1248, Aroclor 1254, and Aroclor 1260 correspond to the compositions of the products A, B, C, D, E, F, and G shown in Table B (FIG. 3). Also in the case of Mix 2 or Mix 3, the compositions of individual Aroclors were previously determined and set as known compositions.

In FIG. 9, Table D shows the results of quantifications of Aroclor concentrations obtained in this example. Each Aroclor is represented by a number included in its product name, and this applies also to examples that will be described later. The concentrations experimentally acquired did not significantly deviate from the preset concentrations of individual Aroclors in the prepared samples.

Example 2

Aroclors were quantified in substantially the same manner as in Example 1. In Example 2, samples were prepared by adding the following 27 drugs to each of the samples prepared in Example 1. The following drugs are drugs that are or were used as components of insecticides. First mass spectrometry and second mass spectrometry were performed to subject Aroclor and these drugs in each of the samples to mass spectrometry at the same time.

The 27 drugs are as follows: α-BHC (benzene hexachloride), γ-BHC, β-BHC, δ-BHC, Heptachlor, Heptachlor epoxide, Aldrin, Dieldrin, Endrin, Endrin aldehyde, Endrin ketone, trans-Chlordane, cis-Chlordane, Endosulfan I, Endosulfan II, Endosulfan sulfate, 4,4'-DDE (2,2-Bis(4-chlorophenyl)-1,1-dichloroethylene), 4,4'-DDD (4,4'-(2-chlorovinylidene)bis(chlorobenzene)(1,1-Dichloro-2,2-bis (4-chlorophenyl)ethane)), 4,4'-DDT (dichlorodiphenyltrichloroethane), Methoxychlor, Hx-Sed, Hep-Sed, Parlar-26, Parlar-40, 41, Parlar-44, Parlar-50, and Parlar-62.

In FIG. 10, Table E shows the results of quantifications of Aroclor concentrations obtained in this example. Even when Aroclor and the 27 drugs were analyzed at the same time, the concentrations experimentally acquired did not significantly deviate from the preset concentrations of individual Aroclors in the prepared samples.

Example 3

Samples were prepared by adding a predetermined concentration of Aroclor 1232 and the above-mentioned 27 drugs to drainage water and water collected from a river. One kind of chlorobiphenyl was used as a reference sample for each n concerning chlorobiphenyls having n chlorine atom(s) (n=1 to 9). First mass spectrometry and second mass spectrometry were performed to quantify the concentration of Aroclor in the sample. Further, the degrees of similarity with individual Aroclors were calculated from the ratios of chlorobiphenyls different in chlorine number n contained in each of the samples.

Method

As internal standards, a d10 stable isotope of chlorpyrifos, 4,4'-dibromobiphenyl, a d10 stable isotope of pyrene, and a decachlorobiphenyl were used. As surrogate substances, 2,4,5,6-tetrachloro-m-xylene, a $^{13}C_{12}$ stable isotope of 2,2', 5,5-tetrachlorobiphenyl, a $^{13}C_{12}$ stable isotope of 2,2',4,5,5-pentachlorobiphenyl, and a d14 stable isotope of methoxychlor were used.

Preparation of Samples

Analysis samples were prepared by adding 1 mL of 0.01 μg/mL or 0.1 μg/mL Aroclor 1232, the above-mentioned 27 drugs, and 0.1 mL of a solution containing 1 μg/mL of each of the surrogate substances to 1 L of drainage water and 1 L of water collected from a river. Further, as a reference sample for preparing calibration data for the drugs, a sample containing known concentrations of the 27 drugs and a d10 stable isotope of pyrene (hereinafter referred to as a drug reference sample) was prepared. Further, as a reference sample for preparing calibration data for chlorobiphenyls, a reference sample 1 and a reference sample 2 were prepared as two different reference samples. Chlorobiphenyls include 209 kinds of molecules different in the number of chlorine atoms and the position(s) of a chlorine atom(s), and the individual molecules have their respective numbers assigned by IUPAC. The reference sample 1 and the reference sample 2 were prepared so as to contain, as reference substances for performing calibration of chlorobiphenyls containing 1, 2, 3, 4, 5, 6, 7, 8, and 9 chlorine atoms, chlorobiphenyls of Nos. 1, 4, 18, 52, 101, 149, 187, 199, and 208 and chlorobiphenyls of Nos. 2, 6, 31, 44, 110. 153. 183, 203, and 207, respectively. Further, the reference sample 1 and the reference sample 2 were prepared so as to contain a known concentration of a decachlorobiphenyl.

Extraction and Concentration

The following operations (1) to (9) were performed in numerical order.

(1) The 1 L of water was poured into a separating funnel. (2) The pH of the liquid in the separating funnel was adjusted to lower than 2. (3) 60 mL of dichloromethane was added to the separating funnel, and the resulting mixture was shaken for 2 minutes and then allowed to stand for 10 minutes. (4) A dichloromethane layer was taken out using anhydrous sodium sulfate. (5) The operations (3) and (4) were repeated twice. (6) The pH of the liquid in the separating funnel was adjusted to 11 to 13. (7) The operations (3) and (4) were repeated three times. (8) The extracted solution was concentrated to 1 mL. (9) 10 μL of each 10 μg/mL internal standard solution was added to the concentrated solution.

GC/MS

The prepared sample was subjected to gas chromatography/tandem mass spectrometry (GC/MS/MS). The GC/MS/MS was performed by a triple quadrupole gas chromatograph mass spectrometer, GCMS-TQ8040 (SHIMADZU CORPORATION), using an automatic liquid injection system for gas chromatograph, AOC-20i/S (SHIMADZU CORPORATION) as a sampler and an injector and using GC-2010Plus as a gas chromatograph.

Conditions for Gas Chromatography

The sample was separated by gas chromatography under the following conditions.

Analytical column: SH-Rxi-5MS (SHIMADZU GLC Ltd.)

Injection mode: splitless (high-pressure injection at 250 kPa for 1 min)

Injected amount: 2 μL

Injection temperature: 275° C.

Linear velocity: constant (43.5 cm/sec)

Oven temperature: The oven was kept at 60° C. for 0.5 min, then heated to 180° C. at a rate of 40° C./min, then heated to 280° C. at a rate of 4° C./min, then heated to 330° C. at a rate of 20° C./min, and then kept at 330° C. for 1 min.

Conditions for Mass Spectrometry

A sample gas eluted by the gas chromatography was detected by tandem mass spectrometry.

Ionization method: Electron ionization

Measurement mode: Multiple reaction monitoring (MRM)

Temperature of ion source: 230° C.

Interface temperature: 290° C.

Preparation of Calibration Data

As calibration data for the 27 drugs, relative response factors of the individual drugs with respect to the d10 stable isotope of pyrene used as a reference substance were calculated. As calibration data for chlorobiphenyls, relative response factors of the individual chlorobiphenyls contained in the reference samples 1 and 2 with respect to the decachlorobiphenyl used as a reference substance were calculated. The arithmetic mean and standard deviation of relative response factors calculated by two or more measurements were determined, the standard deviation was divided by the arithmetic mean, and thus obtained value was multiplied by 100 to calculate RSD (%). RSD is an index of efficacy of the relative response factor.

Quantification of Chlorobiphenyls and Drugs and Identification of Aroclor

The concentrations of the individual drugs and the concentration of Aroclor in the analysis sample were calculated using the obtained calibration data. Further, the ratio of the amount of all the chlorobiphenyls containing n chlorine atom(s) with respect to the total amount of chlorobiphenyls was calculated for each n. On the basis of the obtained ratios, the degree of similarity between the composition of chlorobiphenyls in the analysis sample and the previously-determined known composition of each of Aroclor 1016, Aroclor 1221, Aroclor 1232, Aroclor 1242, Aroclor 1248, Aroclor 1254, and Aroclor 1260 was calculated by the above formula (2).

Results

In FIG. 11, Table F shows the calibration ranges and RSDs of the individual drugs contained in the drug reference sample. In FIG. 12, Table G shows the calibration ranges and RSDs of the chlorobiphenyls contained in the reference sample 1. In FIG. 13, Table H shows the calibration ranges and RSDs of the chlorobiphenyls contained in the reference sample 2. As shown in Table F, the RSDs of the individual drugs were less than 30, which indicates that analysis can be performed. As shown in Table G and Table H, the RSDs of the individual chlorobiphenyls were less than 20, which indicates that calibration can accurately be performed.

The following Table 1 shows the recoveries of the individual drugs in the analysis samples. The recovery is expressed as the ratio (%) of the concentration of each of the drugs determined by quantification with respect to the concentration of each of the drugs added to the analysis sample. In the table, "LCB" represents a blank sample using ultrapure water, and "LCS" represents an analysis sample using ultrapure water instead of the drainage water or the river water. The same applies also to the following tables 2 and 3. "LLOQ" indicates that a value was not calculated because the value was lower than the lowest concentration in the calibration data.

TABLE 1

Recoveries of Individual Drugs

| | | | Drainage water | | River water | |
|---|---|---|---|---|---|---|
| Compounds | LCB | LCS (0.1 µg/L) | Added amount 0.01 µg/L | Added amount 0.1 µg/L | Added amount 0.01 µg/L | Added amount 0.1 µg/L |
| α-BHC | 0.0 | 59.7 | 70.2 | 65.8 | 65.6 | 68.1 |
| γ-BHC | 0.0 | 58.0 | 69.2 | 66.2 | 69.7 | 67.9 |
| β-BHC | 0.0 | 59.1 | 67.4 | 66.9 | 71.7 | 68.0 |
| δ-BHC | 0.0 | 60.0 | 67.8 | 64.6 | 70.7 | 66.9 |
| Heptachlor | 0.0 | 73.7 | 88.1 | 82.5 | 75.3 | 82.3 |
| Heptachlor epoxide | 0.0 | 81.8 | 93.8 | 86.1 | 81.2 | 92.6 |
| Aldrin | <LLOQ | 67.0 | 125.5 | 76.2 | 64.1 | 74.4 |
| Dieldrin | 0.0 | 79.6 | 82.6 | 86.1 | 68.3 | 91.1 |
| Endrin | 0.0 | 110.0 | 102.9 | 118.1 | 96.0 | 119.3 |
| Endrin aldehyde | 0.0 | 81.8 | <LLOQ | 15.4 | <LLOQ | 45.3 |
| Endrin ketone | 0.0 | 81.5 | <LLOQ | 93.0 | <LLOQ | 96.4 |
| trans-Chlordane | 0.0 | 75.3 | 75.8 | 82.6 | 84.1 | 88.5 |
| cis-Chlordane | 0.0 | 78.4 | 84.4 | 83.6 | 83.3 | 87.1 |
| Endosulfan I | 0.0 | 80.2 | 91.4 | 85.1 | 73.1 | 87.5 |
| Endosulfan II | 0.0 | 85.7 | 72.8 | 84.6 | 73.7 | 91.0 |
| Endosulfan sulfate | 0.0 | 67.1 | 70.2 | 71.3 | 74.0 | 73.1 |
| 4,4'-DDE | 0.0 | 63.6 | 67.3 | 67.1 | 72.4 | 69.0 |
| 4,4'-DDD | 0.0 | 74.6 | 83.4 | 82.5 | 96.9 | 97.1 |
| 4,4'-DDT | <LLOQ | 83.6 | 91.9 | 87.4 | 71.2 | 67.0 |
| Methoxychlor | 0.0 | 88.6 | 97.3 | 93.9 | 68.7 | 69.7 |
| Hx-Sed | 0.0 | 98.0 | 64.0 | 93.6 | 67.1 | 95.6 |
| Hep-Sed | 0.0 | 92.3 | <LLOQ | 95.0 | <LLOQ | 98.4 |
| Parlar-26 | 0.0 | 99.0 | <LLOQ | 92.0 | <LLOQ | 102.4 |
| Parlar40,41 | 0.0 | 101.3 | <LLOQ | 99.0 | <LLOQ | 102.8 |
| Parlar-44 | 0.0 | 103.4 | <LLOQ | 105.5 | <LLOQ | 94.8 |
| Parlar-50 | 0.0 | 106.0 | <LLOQ | 86.7 | <LLOQ | 94.8 |
| Parlar-62 | 0.0 | 137.3 | <LLOQ | 124.1 | <LLOQ | 77.1 |

The following Table 2 shows the recoveries of Aroclor in the analysis samples. The recovery is expressed as the ratio (%) of the concentration of Aroclor determined by quantification with respect to the concentration of Aroclor added to the analysis sample.

TABLE 2

Recoveries of Aroclor

| | | | Drainage water | | River water | |
|---|---|---|---|---|---|---|
| | LCB | LCS (0.1 µg/L) | Added amount 0.01 µg/L | Added amount 0.1 µg/L | Added amount 0.01 µg/L | Added amount 0.1 µg/L |
| Reference sample 1 | 0 | 107.9 | 128.1 | 105.0 | 102.4 | 107.6 |
| Reference sample 2 | 0 | 116.2 | 139.3 | 112.7 | 101.8 | 115.3 |

The following Table 3 shows the degrees of similarity between the compositions of chlorobiphenyls in the analysis samples and the compositions of chlorobiphenyls in the individual Aroclors.

TABLE 3

Degrees of Similarity with Individual Aroclor Products

|  | Products | LCS (0.1 μg/L) | Drainage water Added amount 0.01 μg/L | Drainage water Added amount 0.1 μg/L | River water Added amount 0.01 μg/L | River water Added amount 0.1 μg/L |
|---|---|---|---|---|---|---|
| Reference sample 1 | 1016 | 65 | 59 | 64 | 55 | 63 |
|  | 1221 | 58 | 56 | 60 | 60 | 59 |
|  | 1232 | 94 | 91 | 95 | 86 | 95 |
|  | 1242 | 64 | 59 | 62 | 57 | 63 |
|  | 1248 | 47 | 43 | 46 | 47 | 47 |
|  | 1254 | 22 | 26 | 21 | 27 | 22 |
|  | 1260 | 2 | 10 | 2 | 9 | 3 |
| Reference sample 2 | 1016 | 66 | 60 | 65 | 58 | 64 |
|  | 1221 | 55 | 53 | 57 | 61 | 56 |
|  | 1232 | 93 | 90 | 95 | 91 | 94 |
|  | 1242 | 65 | 62 | 64 | 60 | 64 |
|  | 1248 | 50 | 50 | 49 | 47 | 50 |
|  | 1254 | 17 | 22 | 17 | 18 | 17 |
|  | 1260 | 2 | 9 | 1 | 4 | 3 |

It was confirmed from Tables 1 to 3 that simultaneous analysis of drugs and chlorobiphenyls in samples using drainage water and samples using water collected from a river can be performed. Further, as shown in Table 3, the degree of similarity with Aroclor 1232 added to the analysis sample was highest, which indicates that Aroclor contained in the analysis sample was accurately identified.

The disclosure of the following priority application is herein incorporated by reference: U.S. Patent Provisional Application No. 62/653,014 (filed Apr. 5, 2018).

REFERENCE SIGNS LIST

1 Mass spectrometry device
10 Gas chromatograph
11 Carrier gas channel
12 Sample introduction part
14 Separation column
30 Mass spectrometry section
31 Vacuum container
33 Ionization part
35 Mass separation part
36 Detection part
40 Information processing unit
44 Output section
50 Control section
51 Device control part
52 Data processing part
100 Measurement unit
521 Intensity data acquisition part
522 Calibration data preparation part
523 Calculation part
524 Reference data acquisition part
525 Information generation part
53 Output control part
Cr1 Monochlorobiphenyl
Cr2 Dichlorobiphenyl
Cr9 Nonachlorobiphenyl
In Ion
S Sample to be analyzed
S1, S2, S9 Reference samples

The invention claimed is:

1. A mass spectrometry method comprising:
preparing calibration data for performing calibration on a basis of first data obtained by detecting a chlorobiphenyl in first mass spectrometry of a reference sample of the chlorobiphenyl;
acquiring second data obtained by detecting, in second mass spectrometry of a sample, at least one chlorobiphenyl that has a same chlorine number as and is different in kind from the chlorobiphenyl detected in the first mass spectrometry; and
calculating a quantitative value for the chlorobiphenyl contained in the sample on a basis of the calibration data and the second data.

2. The mass spectrometry method according to claim 1, wherein:
the first data obtained by the first mass spectrometry includes data obtained by detecting two or more kinds of chlorobiphenyls different in chlorine number; and
the second data obtained by the second mass spectrometry includes data obtained by detecting two or more kinds of chlorobiphenyls different in chlorine number contained in the sample.

3. The mass spectrometry method according to claim 1, wherein:
the second data obtained by the second mass spectrometry includes data obtained by detecting two or more kinds of chlorobiphenyls having a same chlorine number.

4. The mass spectrometry method according to claim 3, wherein:
the detection in the second mass spectrometry includes detection of chlorobiphenyls whose number of kinds is larger than that of chlorobiphenyls having the chlorine number detected in the first mass spectrometry.

5. The mass spectrometry method according to claim 3, wherein:
in the second mass spectrometry, the two or more kinds of chlorobiphenyls are mass-separated under same conditions for an m/z range of molecules to be mass-separated.

6. The mass spectrometry method according to claim 3, wherein:
an intensity corresponding to all the two or more kinds of chlorobiphenyls having a same chlorine number contained in the sample is calculated on a basis of the second data; and the quantitative value is calculated on a basis of the calculated intensity and the calibration data.

7. The mass spectrometry method according to claim 6, wherein:
when a number of chlorine atoms contained in a chlorobiphenyl is defined as n,
a quantitative value corresponding to all chlorobiphenyls containing n chlorine atom(s) is calculated for each of different values of n.

8. The mass spectrometry method according to claim 1, wherein:
the calibration data is calibration data including a correspondence relationship between a concentration of the reference sample of the chlorobiphenyl and a detected intensity of the chlorobiphenyl; and
the quantitative value is a concentration value of the chlorobiphenyl detected in the second mass spectrometry.

9. The mass spectrometry method according to claim 1, wherein:
the calculation of a quantitative value includes calculation of a quantitative value for each of two or more kinds of chlorobiphenyls different in chlorine number detected in the second mass spectrometry, and the method includes calculation of a relative amount indicating a ratio of an amount of a chlorobiphenyl having a certain chlorine number detected in the second mass spectrometry with respect to an amount of at least one kind of chlorobiphenyl having another chlorine number detected in the second mass spectrometry or a total amount of chlorobiphenyls detected in the second mass spectrometry on a basis of the quantitative values of the chlorobiphenyls.

10. The mass spectrometry method according to claim 9, further comprising:

acquiring reference data including ratios of chlorobiphenyls different in chlorine number in a mixture containing two or more kinds of chlorobiphenyls different in chlorine number; and identifying a mixture of chlorobiphenyls contained in the sample on a basis of the reference data and the relative amounts.

11. The mass spectrometry method according to claim 1, wherein:

the calculation of a quantitative value includes calculation of a quantitative value for each of two or more kinds of chlorobiphenyls different in chlorine number detected in the second mass spectrometry; and a sum of quantitative values calculated for the individual two or more kinds of chlorobiphenyls different in chlorine number is calculated as a quantitative value for a mixture of chlorobiphenyls.

12. A mass spectrometry device comprising:

a calibration data preparation part configured to prepare calibration data for performing calibration on a basis of first data obtained by detecting a chlorobiphenyl in first mass spectrometry of a reference sample of the chlorobiphenyl;

a data acquisition part configured to acquire second data obtained by detecting, in second mass spectrometry of a sample, at least one chlorobiphenyl that has a same chlorine number as and is different in kind from the chlorobiphenyl detected in the first mass spectrometry; and a calculation part configured to calculate a quantitative value for the chlorobiphenyl contained in the sample on a basis of the calibration data and the second data.

13. A non-transitory computer readable medium including a program for allowing a processing device to perform:

calibration data preparation processing in which calibration data for performing calibration is prepared on a basis of first data obtained by detecting a chlorobiphenyl in first mass spectrometry of a reference sample of the chlorobiphenyl;

data acquisition processing in which second data obtained by detecting, in second mass spectrometry of a sample, at least one chlorobiphenyl that has a same chlorine number as and is different in kind from the chlorobiphenyl detected in the first mass spectrometry is acquired; and calculation processing in which a quantitative value is calculated for the chlorobiphenyl contained in the sample on a basis of the calibration data and the second data.

14. A mass spectrometry kit for use in the mass spectrometry method according to claim 1.

* * * * *